US012123330B2

(12) United States Patent
Wang et al.

(10) Patent No.: US 12,123,330 B2
(45) Date of Patent: Oct. 22, 2024

(54) FULLY VARIABLE ELECTRO-HYDRAULIC VALVE SYSTEM

(71) Applicant: WEIFANG LICHUANG ELECTRONIC TECHNOLOGY CO., LTD, Weifang (CN)

(72) Inventors: Lifeng Wang, Weifang (CN); Xiuqiang Wang, Weifang (CN)

(73) Assignee: WEIFANG LICHUANG ELECTRONIC TECHNOLOGY CO., LTD, Weifang (CN)

( * ) Notice: Subject to any disclaimer, the term of this patent is extended or adjusted under 35 U.S.C. 154(b) by 260 days.

(21) Appl. No.: 17/791,170

(22) PCT Filed: Dec. 29, 2020

(86) PCT No.: PCT/CN2020/140614
§ 371 (c)(1),
(2) Date: Jul. 6, 2022

(87) PCT Pub. No.: WO2021/139564
PCT Pub. Date: Jul. 15, 2021

(65) Prior Publication Data
US 2023/0031051 A1    Feb. 2, 2023

(30) Foreign Application Priority Data

Jan. 10, 2020 (CN) ............ 202010026697.5
Jan. 10, 2020 (CN) ............ 202010026706.0
Jan. 10, 2020 (CN) ............ 202010026736.1

(51) Int. Cl.
*F01L 9/14* (2021.01)
*F01L 13/00* (2006.01)

(52) U.S. Cl.
CPC ............. *F01L 9/14* (2021.01); *F01L 13/0015* (2013.01)

(58) Field of Classification Search
CPC ....... F01L 9/10; F01L 9/14; F01L 9/16; F01L 9/20; F01L 9/40; F01L 13/0015; F01L 13/0031; F01L 2013/105; Y02T 10/12
(Continued)

(56) References Cited

U.S. PATENT DOCUMENTS 11,788,441 B2 * 10/2023 Wang ................. F01L 9/16
123/90.11

FOREIGN PATENT DOCUMENTS

CN    101713308 A    5/2010
CN    106762001 A    5/2017
(Continued)

OTHER PUBLICATIONS

International Search Report for corresponding International Patent Application No. PCT/CN2020/140614, dated Apr. 1, 2021.

*Primary Examiner* — Kenneth J Hansen
*Assistant Examiner* — Kelsey L Stanek
(74) *Attorney, Agent, or Firm* — LOZA & LOZA, LLP; Michael F. Fedrick

(57) ABSTRACT

A fully variable electro-hydraulic valve system, comprising a sliding sleeve (A103, B103), a spiral shaft (A102, B102), a piston (A105, B105), and a reset spring (A104, B104). The sliding sleeve (A103, B103) is fixed relative to an engine; the piston (A105, B105) abuts against a valve assembly (106); the spiral shaft (A102, B102) is axially controlled by a cam surface of a camshaft (101); and the spiral shaft (A102, B102) is provided with a spiral groove (A102D, B102D) and a blockage part (A102G, B102G). When the spiral groove (A102D, B102D) communicates with a limiting oil hole (A118, B118), a sliding sleeve cavity (Q) communicates with a low-pressure oil path of the engine for pressure relief.

22 Claims, 10 Drawing Sheets

(58) Field of Classification Search
USPC ...................................................... 123/90.12
See application file for complete search history.

(56) References Cited

FOREIGN PATENT DOCUMENTS

| | | |
|---|---|---|
| CN | 111075531 A | 4/2020 |
| CN | 111173585 A | 5/2020 |
| CN | 111206973 A | 5/2020 |
| CN | 211343051 U | 8/2020 |
| CN | 211343052 U | 8/2020 |
| CN | 211343053 U | 8/2020 |
| DE | 3807699 A1 | 9/1989 |

\* cited by examiner

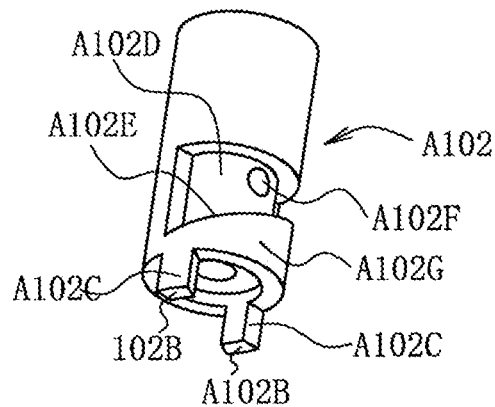 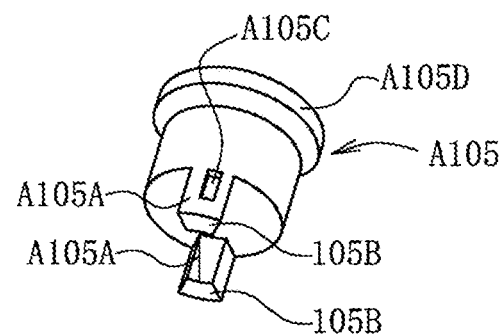
Figure 2A               Figure 3A
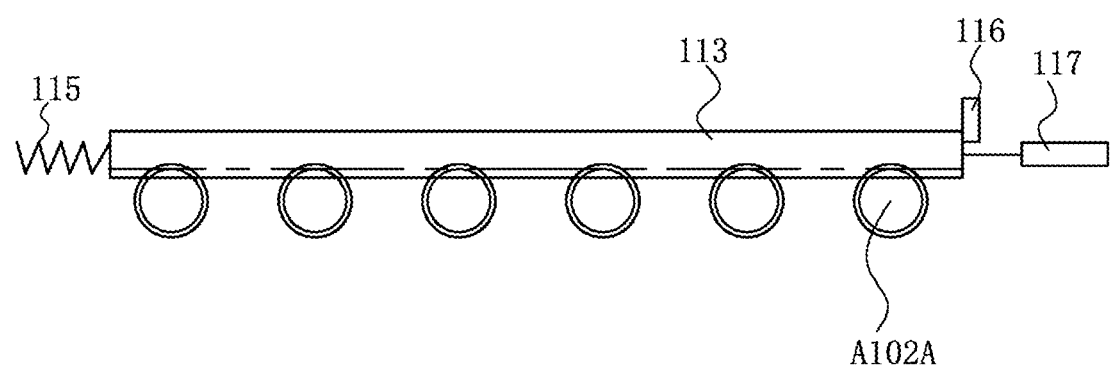
Figure 4A

FULLY VARIABLE ELECTRO-HYDRAULIC VALVE SYSTEM

Cross-Reference to Related Applications

This application is the U.S. national stage of International Patent Application No. PCT/CN2020/140614, filed on Dec. 29, 2020 and entitled FULLY VARIABLE ELECTRO-HYDRAULIC VALVE SYSTEM, which claims the benefit of priority under 35 U.S.C. § 119 from Chinese Patent Application No. CN202010026697.5, filed on Jan. 10, 2020; Chinese Patent Application No. CN202010026706.0, filed on Jan. 10, 2020; and Chinese Patent Application No. CN202010026736.1, filed on Jan. 10, 2020. The disclosures of the foregoing applications are incorporated herein by reference in their entirety.

FIELD

The present invention relates to the technical field of engine valve systems, in particular to a fully variable electro-hydraulic valve system.

BACKGROUND

A Fully Variable Valve System (short for FVVS) may achieve continuous variation of the maximum stroke of a valve, a valve opening duration angle and valve timing, which is significant to energy conservation and emission reduction of an engine. The FVVS may control the amount of a working medium entering an air cylinder in an early intake valve closing (EIVC) manner, thereby canceling a throttle valve. Such a gasoline engine without a throttle valve will greatly reduce the pumping loss, thereby reducing the oil consumption by 10-15% under low and moderate loads. The FVVS is matched with supercharged inter-cooling, by which the problems of detonation and high thermal load caused after the engine is supercharged may be solved, low-temperature consumption may be achieved on the premise that the mean effective pressure is greatly increased, the thermal efficiency of the engine may be improved, the emission of harmful gases may be reduced, and therefore, a FVVS technology has become one of important development trends of a novel engine technology.

At present, the relatively advanced FVVS is a MultiAir (also known as UniAir) system jointly developed by Schaeffler and Fiat, a camshaft-driven electro-hydraulic valve system in which a valve moves under the joint control of a camshaft and an electromagnetic valve is adopted in the system. A working principle of the system is described as follows: a hydraulic piston is pushed by a cam and is connected with a driving piston via a sliding sleeve cavity, and the sliding sleeve cavity is controlled by a switching electromagnetic valve. When the electromagnetic valve is in a fully closed state, the hydraulic piston pushes the driving piston by means of a liquid pressure to transfer a hydraulic pressure generated by the rotation of the cam to a valve; at the moment, the intake valve is completely controlled by the cam to be in an open state. When the electromagnetic valve is in a fully open state, a driving force may not be transferred by the liquid pressure, the hydraulic piston may not push the driving piston, and the intake valve is not controlled by the cam any more and is in a falling or closed state. By controlling the opening and closing moments of the electromagnetic valve, various different movement rules of the valve may be achieved, and functions of the FVVS may be achieved. However, the electromagnetic valve is complex in structure and high in price, which limits the popularization and application of the technology.

In order to replace the expensive high-speed electromagnetic valve, the Chinese invention patent CN109339896A discloses a fully variable electro-hydraulic valve device including a camshaft and a valve assembly; a spiral shaft, a sliding sleeve, a piston, and a reset spring, wherein the spiral shaft and the piston are slidably connected with the sliding sleeve respectively in a sealing manner, the piston abuts against the valve assembly, in the sliding sleeve, a sealed sliding sleeve cavity is formed in a space between the spiral shaft and the piston, and the reset spring is clamped and pressed between the spiral shaft and the piston; the spiral shaft is axially controlled by a cam surface of the camshaft; the circumferential wall, slidably connected with the sliding sleeve in the sealing manner, of the spiral shaft is a spiral circumferential wall, an end of the spiral shaft is provided with control gears meshed with a rack, and the rack is driven by a linear execution mechanism controlled by an electronic control unit of an engine; and the sliding sleeve is provided with an oil inlet hole and a limiting oil hole, the oil inlet hole is close to the spiral shaft, the limiting oil hole is close to the piston, the oil inlet hole and the limiting oil hole respectively communicate with a low-pressure oil path of the engine, and a one-way valve is disposed on a connecting pipeline between the limiting oil hole and the low-pressure oil path of the engine. In the present invention, the valve is jointly controlled by the spiral shaft and the camshaft to move, and the moment when the oil inlet hole is opened or closed is changed by rotating the spiral shaft, so that the functions of the FVVS may be achieved, and the FVVS is high in response speed, convenient to control and suitable for being applied to a multi-cylinder engine and replaces the expensive high-speed electromagnetic valve.

However, it is found in applications that firstly, if the device is applied to the control on a variable stroke of an intake valve, since most of engines are designed with scavenging processes, which requires that a crank angle (relative to a top dead center) corresponding to an intake valve opening moment to remain unchanged, however, the device may only block the limiting oil hole at a certain moment of an ascending stage of the cam surface, FIG. 10 shows a group of curves of a crank angle/valve stroke of the device and shows that the crank angle corresponding to the valve opening moment may be changed with the blockage moment of the limiting oil hole, and therefore, the applications of the device are limited; secondly, in a stopping process of the engine, hydraulic oil in the sliding sleeve cavity may slowly leak, and when the engine is started, it is possible that "no oil" phenomenon occurs in the sliding sleeve cavity, thereby causing working failure of the system; and thirdly, the system is overhigh in seating speed in an electro-hydraulic valve seating process, which causes impact damage on a sealing surface between the valve and a valve seat, thereby affecting the service life.

SUMMARY

For overcoming the above-mentioned defects in the prior art, the present invention provides a fully variable electro-hydraulic valve system to solve the problem that the normal operation of the system is affected due to machine oil loss in a sliding sleeve cavity, and enable a crank angle corresponding to a valve opening moment to remain unchanged.

In order to solve the above-mentioned technical problems, the present invention adopts the technical solutions.

A fully variable electro-hydraulic valve system includes a camshaft and a valve assembly; a sliding sleeve, a spiral shaft, a piston, and a reset spring, wherein the sliding sleeve is fixed relative to an engine, the spiral shaft and the piston are slidably connected with the sliding sleeve respectively in a sealing manner, an inner cavity between the spiral shaft and the piston is known as a sliding sleeve cavity, the reset spring is clamped and pressed between the spiral shaft and the piston, the piston abuts against the valve assembly, and the spiral shaft is axially controlled by a cam surface of the camshaft; the spiral shaft is provided with a first end and a second end which are disposed oppositely, the spiral shaft is provided with a spiral structure, the second end of the spiral shaft is in transmission connection with a gear and rack mechanism, the gear and rack mechanism includes control gears and a rack, the control gears are disposed at the second end of the spiral shaft, and the rack is driven by a linear execution mechanism controlled by an electronic control unit of the engine; the sliding sleeve is provided with an oil inlet hole and a limiting oil hole, the oil inlet hole and the limiting oil hole respectively communicate with a low-pressure oil path of the engine, and a one-way valve is disposed on a connecting pipeline between the oil inlet hole and the low-pressure oil path of the engine; the spiral structure includes a spiral groove formed in a circumferential surface of the spiral shaft, the groove surface, close to the first end of the spiral shaft, of the spiral groove, is a spiral surface, the part between the spiral surface and the first end of the spiral shaft is a blockage part capable of blocking the limiting oil hole, the spiral groove is provided with an oil through hole, the oil through hole communicates with the spiral groove and the sliding sleeve cavity, and when the spiral groove communicates with the limiting oil hole, the sliding sleeve cavity communicates with the low-pressure oil path of the engine for pressure relief; spiral shaft axial projection portions are disposed at the first end of the spiral shaft, the spiral shaft axial projection portions are provided with spiral shaft abutting planes, piston axial projection portions are disposed at the end, opposite to the spiral shaft, of the piston, and the head portions of the piston axial projection portions are provided with piston abutting planes; the sliding sleeve is provided with a positioning pin, the piston is provided with a guide groove extending axially, and the positioning pin extends into the guide groove; and the gear and rack mechanism is further provided with a limiting device and a return spring, and when the return spring enables the rack to move to an extreme position limited by the limiting device, the piston abutting planes abut against the spiral shaft abutting planes, the limiting oil hole is blocked by the blockage part of the spiral shaft, and the valve stroke of the valve assembly is controlled by the camshaft.

When the spiral shaft is controlled by a basic circle segment of the cam surface and the rack moves towards a direction opposite to the limiting device to reach another extreme position, the spiral groove communicates with the limiting oil hole.

The first end of the spiral shaft is provided with two spiral shaft axial projection portions, and the head position of each of the two spiral shaft axial projection portions is provided with one spiral shaft abutting plane; and two piston axial projection portions are provided, the head position of each of the two piston axial projection portions is provided with one piston abutting planes, and the piston abutting planes correspond to the spiral shaft abutting planes one to one.

The two piston abutting planes are coplanar, and the two spiral shaft abutting planes are coplanar.

The two piston abutting planes are symmetrically disposed relative to the center of the piston, and the two spiral shaft abutting planes are symmetrically disposed relative to the center of the spiral shaft.

The control gears are connected with the spiral shaft in a torque transfer manner.

The rack is meshed with the plurality of control gears of the spiral shaft at the same time.

A piston end of the sliding sleeve is provided with a step hole structure including a large hole and a small hole, the small hole is matched with a slidable sealing surface of the piston, a buffering ring is disposed in the large hole, the buffering ring sleeves the slidable sealing surface of the piston and is slidably matched with the inner circumferential surface of the large hole in a sealing manner, and the buffering ring and the piston form a buffering cavity in the step hole; the circumferential surface of the outer end of the piston is provided with a flange for colliding with the buffering ring when a valve of the valve assembly is seated, the piston end of the sliding sleeve is provided with a baffle, and when the valve of the valve assembly is closed, a buffer distance is formed between the buffering ring and the baffle; and the sliding sleeve is provided with a buffering oil hole communicating with the buffering cavity, and the buffering oil hole communicates with the low-pressure oil path of the engine via a throttling device.

As the same concept, the present invention adopts another technical solution.

A fully variable electro-hydraulic valve system includes a camshaft and a valve assembly; a sliding sleeve, a spiral shaft, a piston, and a reset spring, wherein the sliding sleeve is provided with a first end and a second end which are disposed oppositely, the sliding sleeve is provided with an oil inlet hole and a limiting oil hole, the spiral shaft is provided with a first end and a second end which are disposed oppositely, the spiral shaft is provided with a spiral structure, the spiral shaft and the piston are slidably connected with the sliding sleeve respectively in a sealing manner, an inner cavity between the spiral shaft and the piston is known as a sliding sleeve cavity, the reset spring is clamped and pressed between the spiral shaft and the piston, the piston abuts against the valve assembly, and the spiral shaft is axially controlled by a cam surface of the camshaft; and a gear and rack mechanism, wherein the gear and rack mechanism includes control gears and a rack, and the rack is driven by a linear execution mechanism controlled by an electronic control unit of an engine; a limiting sleeve is disposed outside the sliding sleeve, the limiting sleeve is fixed relative to the engine, the sliding sleeve and the limiting sleeve are rotatably mounted, and the sliding sleeve is restrained by an axial limiting structure; the limiting sleeve is provided with a first oil hole of the limiting sleeve and a second oil hole of the limiting sleeve, a first annular groove and a second annular groove are formed in the inner wall of the limiting sleeve, the first oil hole of the limiting sleeve communicates with the limiting oil hole via the first annular groove, the second oil hole of the limiting sleeve communicates with the oil inlet hole via the second annular groove, the first oil hole of the limiting sleeve and the second oil hole of the limiting sleeve respectively communicate with a low-pressure oil path of the engine, and a one-way valve is disposed on a connecting pipeline between the second oil hole of the limiting sleeve and the low-pressure oil path of the engine; the spiral structure includes a spiral groove formed in a circumferential surface of the spiral shaft, the groove surface, close to the first end of the spiral shaft, of the spiral groove, is a spiral surface, the part between the spiral surface and the first end of the spiral shaft is a blockage part capable of blocking the limiting oil hole, the spiral groove is provided with an oil through hole, the oil through hole communicates with the spiral groove and the sliding sleeve cavity, and when the spiral groove communicates with the limiting oil hole, the sliding sleeve cavity communicates with the low-pressure oil path of the engine for pressure relief; spiral shaft axial projection portions are disposed at the first end of the spiral shaft, the spiral shaft axial projection portions are provided with spiral shaft abutting planes, piston axial projection portions are disposed at the end, opposite to the spiral shaft, of the piston, and the head portions of the piston axial projection portions are provided with piston abutting planes; the sliding sleeve is provided with a first positioning pin, the piston is provided with a first guide groove extending axially, and the first positioning pin extends into the first guide groove; the spiral shaft is provided with a second guide groove, the second guide groove extends in the axial direction of the spiral shaft, a second positioning pin extends into the second guide groove, and the second positioning pin is fixed relative to the engine; and the control gears are disposed at the second end of the sliding sleeve, the gear and rack mechanism is further provided with a limiting device and a return spring, and when the return spring enables the rack to move to an extreme position limited by the limiting device, the piston abutting planes abut against the spiral shaft abutting planes, the limiting oil hole is blocked by the blockage part of the spiral shaft, and the valve stroke of the valve assembly is controlled by the camshaft.

As the same concept, the present invention adopts further technical solution.

A fully variable electro-hydraulic valve system includes a camshaft and a valve assembly; a sliding sleeve, a sliding shaft, a piston, and a reset spring, wherein the sliding sleeve is fixed relative to an engine, the sliding shaft and the piston are slidably connected with the sliding sleeve respectively in a sealing manner, an inner cavity between the sliding shaft and the piston is known as a sliding sleeve cavity, the reset spring is clamped and pressed between the sliding shaft and the piston, the piston abuts against the valve assembly, and the sliding shaft is axially controlled by a cam surface of the camshaft; the sliding shaft is provided with a first end and a second end which are disposed oppositely, the second end of the sliding shaft is in transmission connection with a gear and rack mechanism, the gear and rack mechanism includes control gears and a rack, the control gears are disposed at the second end of the sliding shaft, and the rack is driven by a linear execution mechanism controlled by an electronic control unit of the engine; the sliding sleeve is provided with an oil inlet hole and an oil through hole, the oil inlet hole and the oil through hole respectively communicate with a low-pressure oil path of the engine, and a one-way valve is disposed on a connecting pipeline between the oil inlet hole and the low-pressure oil path of the engine; the sliding shaft is provided with a limiting oil hole communicating with the sliding sleeve cavity, a spiral groove is formed in the inner hole wall of the sliding sleeve, the groove surface, close to the second end of the sliding shaft, of the spiral groove, is a spiral surface, the spiral groove communicates with the oil through hole, and when the spiral groove communicates with the limiting oil hole, the sliding sleeve cavity communicates with the low-pressure oil path of the engine for pressure relief; sliding shaft axial projection portions are disposed at the first end of the sliding shaft, the sliding shaft axial projection portions are provided with sliding shaft abutting planes, piston axial projection portions are disposed at the end, opposite to the sliding shaft, of the piston, and the head portions of the piston axial projection portions are provided with piston abutting planes; the sliding sleeve is provided with a positioning pin, the piston is provided with a guide groove extending axially, and the positioning pin extends into the guide groove; and the gear and rack mechanism is further provided with a limiting device and a return spring, and when the return spring enables the rack to move to an extreme position limited by the limiting device, the piston abutting planes abut against the sliding shaft abutting planes, the limiting oil hole is blocked by a non-groove part of the sliding sleeve, and the valve stroke of the valve assembly is controlled by the camshaft.

After the above-mentioned technical solutions are adopted, the present invention achieves the beneficial effects.

1) Since the spiral shaft is provided with the spiral groove and the blockage part, before the cam surface pushes the spiral shaft to move downwards, the limiting oil hole has been blocked by the blockage part, the piston is in rigid connection with the spiral shaft, the valve is opened therewith when the spiral shaft moves downwards, and the opening moment is always unchanged. The spiral shaft further moves downwards, when the spiral groove communicates with the limiting oil hole, the sliding sleeve cavity communicates with the low-pressure oil path of the engine for pressure relief, so that the valve is uncontrolled by the cam surface and is seated and closed under the action of a spring force of the valve. The moment when the spiral groove communicates with the limiting oil hole may be changed by rotating the spiral shaft, then, the valve closing moment is changed, and thus, functions of a fully variable valve system may be achieved. However, a crank angle corresponding to a valve opening moment remains unchanged, and therefore, the system is particularly suitable for being applied to the control of the variable stroke of an intake valve of an engine having a scavenging process. When the valve returns, hydraulic oil enters the sliding sleeve cavity from the oil inlet hole and enables the spiral shaft to rapidly reset together with the reset spring, the linear execution mechanism controlled by the electronic control unit of the engine drives the spiral shaft to rotate, and therefore, the system is high in response speed, convenient to control, capable of replacing an expensive high-speed electromagnetic valve and suitable for being applied to a multi-cylinder engine.

As the same concept, the moment when the spiral groove communicates with the limiting oil hole may be further changed by rotating the sliding sleeve, and then, the valve closing moment is changed.

As the same concept, it is also possible that the spiral groove is formed in the inner hole wall of the sliding sleeve, and the sliding shaft is provided with the limiting oil hole communicating with the sliding sleeve cavity. Before the cam surface pushes the sliding shaft to move downwards, the limiting oil hole has been blocked by the non-groove part of the sliding sleeve, the piston is in rigid connection with the sliding shaft, the valve is opened therewith when the spiral shaft moves downwards, and the opening moment is always unchanged. The sliding shaft further moves downwards, when the spiral groove communicates with the limiting oil hole, the sliding sleeve cavity communicates with the low-pressure oil path of the engine for pressure relief, so that the valve is uncontrolled by the cam surface and is seated and closed under the action of a spring force of the valve. The moment when the spiral groove communicates with the limiting oil hole may be changed by rotating the sliding shaft, then, the valve closing moment is changed, and thus, functions of a fully variable valve system may be achieved. However, a crank angle corresponding to a valve opening moment remains unchanged all the time, and therefore, the system is particularly suitable for being applied to the control of the variable stroke of an intake valve of an engine having a scavenging process.

2) After the engine stops and the ECU is powered off, the rack moves to the extreme position of the limiting device under the action of the return spring, at the moment, the piston abutting planes abut against the spiral shaft abutting planes (or the sliding shaft abutting planes), machine oil does not take effects, the camshaft and the valve are in a rigid connection state, the valve stroke of the valve assembly is completely controlled by the camshaft, and thus, influences on the normal operation of the system due to machine oil loss are avoided.

3) When the valve is to be seated, firstly, the piston collides with the buffering ring, the machine oil in the buffering cavity plays a role in damping the movement of the buffering ring due to the effect of the throttling device, the buffering ring slowly moves to enable the valve to be slowly seated, which reduces impact damage on the sealing surface of the valve and the valve seat, thereby effectively prolonging the service life of the valve system. When the valve moves downwards again, the buffering ring moves downwards under the action of the pressure of the machine oil, the buffer distance is very short, and therefore, there is sufficient time for the buffering ring to move to the position of the baffle before the valve is seated again; and the buffering effect of the valve may be adjusted by adjusting the throttling effect and the buffer distance of the throttling device.

4) When the spiral shaft (or the sliding shaft) is controlled by the basic circle segment of the cam surface and the rack moves towards a direction opposite to the limiting device to reach another extreme position, the spiral groove communicates with the limiting oil hole. At the moment, the camshaft has not started to work, the spiral groove has communicated with the limiting oil hole for pressure relief, the piston will stop moving, the valve is closed, and thus, a cylinder deactivation process of the engine may be achieved.

BRIEF DESCRIPTION OF THE DRAWINGS

FIG. 2A is a schematic view showing a three-dimensional structure of a spiral shaft in FIG. 1A;

FIG. 3A is a schematic view showing a three-dimensional structure of a piston in FIG. 1A;

FIG. 4A is a schematic structural view of a gear and rack mechanism for driving the spiral shaft in the embodiment as shown in FIG. 1A;

Figure 1A:
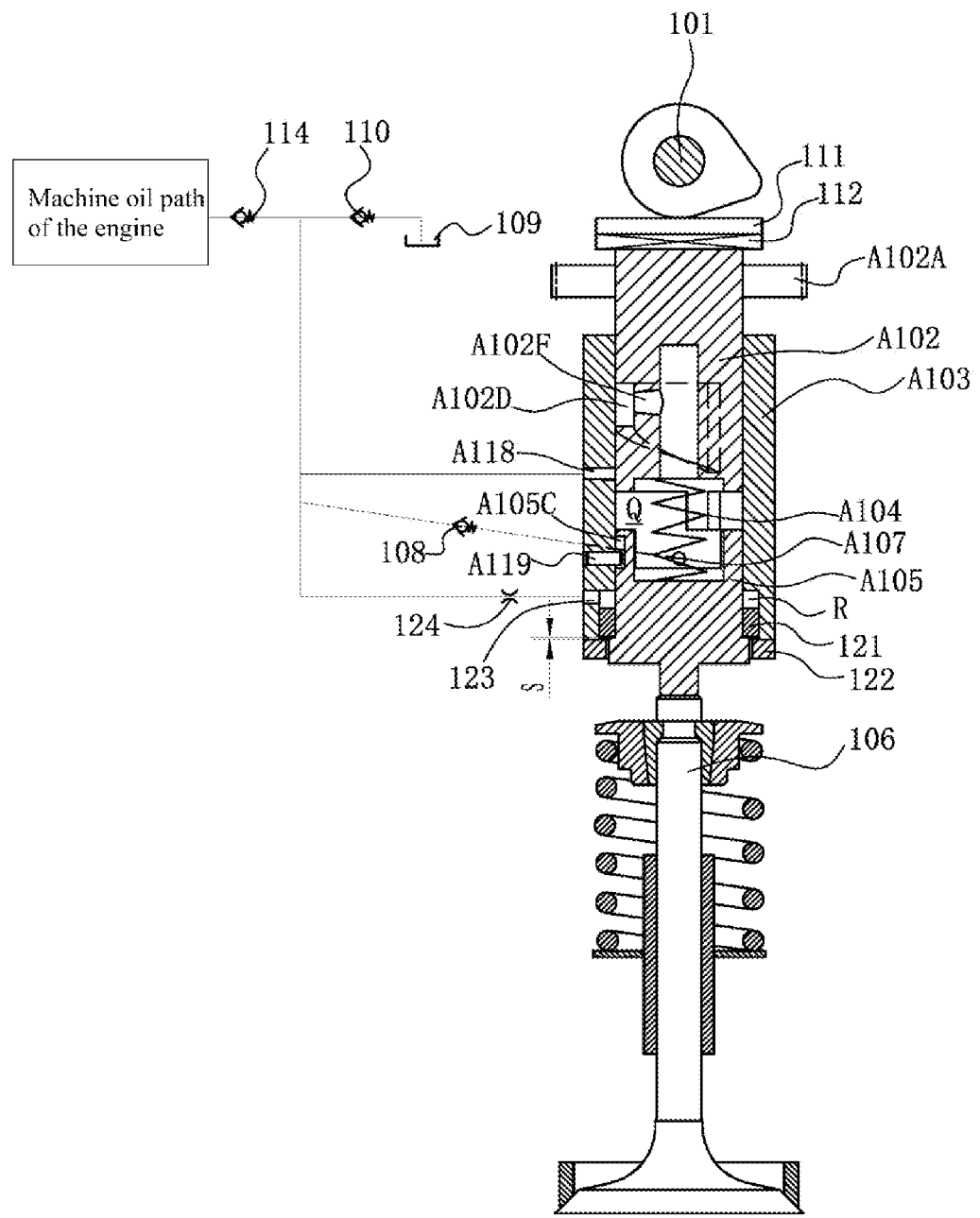
FIG. 1A is a sectional view of embodiment 1 of a fully variable electro-hydraulic valve system provided by the present invention.

In the drawings:
101—camshaft, A102—spiral shaft, A102A—control gear, A102B—spiral shaft abutting plane, A102C—spiral shaft axial projection portion, A102D—spiral groove, A102E—spiral surface, A102F—oil through hole, A102G—blockage part, A103—sliding sleeve, A104—reset spring, A105—piston, A105A—piston axial projection portion, A105B—piston abutting plane, A105C—guide groove, A105D—flange, 106—valve assembly, A107—oil inlet hole, 108—one-way valve, 109—oil pan, 110—pressure retaining valve, 111—wear-resistant gasket, 112—thrust bearing, 113—rack, 114—pressure relief valve, 115—return spring, 116—limiting device, 117—linear execution mechanism, A118—limiting oil hole, A119—positioning pin, 121—buffering ring, 122—baffle, 123—buffering oil hole, 124—throttling device, Q—sliding sleeve cavity, R—buffering cavity, and S—buffer distance;

B102—spiral shaft, B102A—second guide groove, B102B—spiral shaft abutting plane, B102C—spiral shaft axial projection portion, B102D—spiral groove, B102E—spiral surface, B102F—oil through hole, B102G—blockage part, B103—sliding sleeve, B103A—control gear, B104—reset spring, B105—piston, B105A—piston axial projection portion, B105B—piston abutting plane, B105C—first guide groove, B105D—flange, B107—oil inlet hole, B118—limiting oil hole, B119—first positioning pin, 125—limiting sleeve, 125A—first oil hole of the limiting sleeve, 125B—second oil hole of the limiting sleeve, 125C—third oil hole of the limiting sleeve, 126—baffle ring, and 127—second positioning pin; and C102—sliding shaft, C102A—control gear, C102B—sliding shaft abutting plane, C102C—sliding shaft axial projection portion, C102F—limiting oil hole, C103—sliding sleeve, C103A—spiral groove, C103B—spiral surface, C104—reset spring, C105—piston, C105A—piston axial projection portion, C105B—piston abutting plane, C105C—guide groove, C105D—flange, C107—oil inlet hole, C118—oil through hole, and C119—positioning pin.

DETAILED DESCRIPTION OF THE EMBODIMENTS

The present invention will be further described below in conjunction with the accompanying drawings and embodiments.

Embodiment 1

As shown in FIG. 1A, a fully variable electro-hydraulic valve system is provided. A sliding sleeve A103 is fixed relative to an engine, a spiral shaft A102 and a piston A105 are slidably connected with the sliding sleeve A103 respectively in a sealing manner, the spiral shaft A102 is axially controlled by a cam surface of a camshaft 101, and the piston A105 abuts against a valve assembly 106.

In the sliding sleeve A103, a space between the spiral shaft A102 and the piston A105 is a sliding sleeve cavity Q, a reset spring A104 is clamped and pressed between the spiral shaft A102 and the piston A105, and a combined force of the reset spring A104 and an oil pressure acting on the piston A105 is much smaller than a force of a valve spring acting on the piston A105. The sliding sleeve A103 is provided with an oil inlet hole A107 and a limiting oil hole A118; the oil inlet hole A107 is connected with a one-way valve 108, communicates with a machine oil path of the engine via a pressure relief valve 114 and communicates with an oil pan 109 via a pressure retaining valve 110; and the limiting oil hole A118 communicates with the machine oil path of the engine via the pressure relief valve 114 and communicates with the oil pan 109 via the pressure retaining valve 110.

A piston end of the sliding sleeve A103 is provided with a step hole structure including a large hole and a small hole, the small hole is matched with a slidable sealing surface of the piston A105, a buffering ring 121 is disposed in the large hole, the buffering ring 121 sleeves the slidable sealing surface of the piston A105 and is slidably matched with the inner circumferential surface of the large hole in a sealing manner, and the buffering ring 121 and the piston A105 form a buffering cavity R in the step hole; and the circumferential surface of the outer end of the piston A105 is provided with a flange A105D for colliding with the buffering ring 121 when a valve of the valve assembly 106 is seated, the piston end of the sliding sleeve A103 is provided with a baffle 122, and when the valve of the valve assembly 106 is closed, a buffer distance S is formed between the buffering ring 121 and the baffle 122.

The sliding sleeve A103 is further provided with a buffering oil hole 123 communicating with the buffering cavity R, and the buffering oil hole 123 is connected with a throttling device 124, communicates with the machine oil path of the engine via the pressure relief valve 114 and communicates with the oil pan 109 via the pressure retaining valve 110; and the machine oil path of the engine as well as the pressure relief valve 114, the pressure retaining valve 110 and the oil pan 109 associated with the machine oil path of the engine form a low-pressure oil path of the engine; and the throttling device may be a device such as a throttling valve or a throttling hole.

The above-mentioned structure has a buffering function. When the valve is to be seated, firstly, the piston A105 collides with the buffering ring 121, the machine oil in the buffering cavity R plays a role in damping the movement of the buffering ring 121 due to the effect of the throttling device 124, the buffering ring 121 slowly moves to enable the valve to be slowly seated, which reduces impact damage on the sealing surface of the valve and a valve seat, thereby effectively prolonging the service life of the valve system. When the valve moves downwards again, the buffering ring 121 moves downwards under the action of the pressure of the machine oil, the buffer distance S is very short, and therefore, there is sufficient time for the buffering ring 121 to move to the position of the baffle 122 before the valve is seated again; and the buffering effect of the valve may be adjusted by adjusting the throttling effect and the buffer distance of the throttling device 124.

As jointly shown in FIG. 1A, FIG. 2A and FIG. 4A, the spiral shaft A102 is provided with a first end and a second end which are disposed oppositely, the second end is in transmission connection with a gear and rack mechanism including control gears A102A and a rack 113, the control gears A102A are disposed at the second end of the spiral shaft A102, and the rack 113 is driven by a linear execution mechanism 117 controlled by an electronic control unit (ECU) of the engine. The control gears A102A and the spiral shaft A102 are connected in two manners, with one being fixed connection, and the other one being that the control gears A102A are capable of relatively sliding instead of rotating relative to the spiral shaft A102 in an axial direction, such as key connection; and no matter which connection manner is adopted, a torque has to be transferred. The linear execution mechanism 117 is based on a mature technology and may be a linear motor or execution electromagnet or air cylinder or hydraulic cylinder and the like, and a connection relationship between the linear execution mechanism 117 and the rack 113 is also familiar to the ordinary skill in the art, the descriptions thereof are omitted herein.

As shown in FIG. 2A, the spiral shaft A102 is provided with a spiral structure including a spiral groove A102D formed in a circumferential surface of the spiral shaft A102, the groove surface, close to the first end of the spiral shaft A102, of the spiral groove A102D, is a spiral surface A102E, the part between the spiral surface A102E and the first end of the spiral shaft A102 is a blockage part A102G capable of blocking the limiting oil hole A118, the spiral groove A102D is provided with an oil through hole A102F, the oil through hole A102F communicates with the spiral groove A102D and the sliding sleeve cavity Q, and when the spiral groove A102D communicates with the limiting oil hole A118, the sliding sleeve cavity Q communicates with the low-pressure oil path of the engine for pressure relief.

As shown in FIG. 2A, spiral shaft axial projection portions A102C are disposed at the first end of the spiral shaft A102, the spiral shaft axial projection portions A102C are provided with spiral shaft abutting planes A102B. In order to ensure that the stress is more balanced during abutment, the first end of the spiral shaft A102 is provided with two spiral shaft axial projection portions A102C, and each of the two spiral shaft axial projection portions A102C is provided with one spiral shaft abutting plane A102B. The two spiral shaft abutting planes A102B are coplanar and are symmetrically disposed relative to the center of the spiral shaft A102.

As shown in FIG. 1A and FIG. 3A, the sliding sleeve A103 is provided with a positioning pin A119, the piston A105 is provided with a guide groove A105C extending axially, and the positioning pin A119 extends into the guide groove A105C. The degree of freedom of the piston A105 rotating relative to the sliding sleeve A103 is restrained via the positioning pin A119, that is, the piston A105 is only capable of axially moving instead of rotating along the guide groove A105C.

Piston axial projection portions A105A are disposed at the end, opposite to the spiral shaft A102, of the piston A105, and the head portions of the piston axial projection portions A105A are provided with piston abutting planes A105B. In the similar principle, in order to ensure that the stress is more balanced during abutment, two piston axial projection portions A105A are provided, the head position of each of the two piston axial projection portions A105A is provided with one piston abutting plane A105B, and the piston abutting planes A105B correspond to the spiral shaft abutting planes A102B one to one. The two piston abutting planes A105B are coplanar and are symmetrically disposed relative to the center of the piston A105.

In the present invention, the working principle that the valve is jointly controlled by the spiral shaft and the camshaft to move is that:

the machine oil in the machine oil path (the low-pressure oil path) of the engine may flow into the sliding sleeve cavity Q via the oil inlet hole A107 and the limiting oil hole A118. The spiral shaft A102 moves downwards under the action of the camshaft 101, and when the limiting oil hole A118 is blocked by the blockage part A102G of the spiral shaft A102 (at the moment, the machine oil may not flow out of the oil inlet hole A107 due to the effect of the one-way valve 108), the sliding sleeve cavity Q becomes a sealed cavity, the pressure of the hydraulic oil is increased to push the piston A105 to move downwards, and the piston A105 pushes the valve to move downwards.

The linear execution mechanism 117 controlled by the electronic control unit of the engine drives the rack 113 to move so as to push the spiral shaft A102 to rotate. After the spiral shaft abutting planes A102B are separated from the piston abutting planes A105B, since the spiral shaft A102 is provided with the spiral groove A102D and the blockage part A102G, when the cam surface pushes the spiral shaft A102 to move downwards, the limiting oil hole A118 is firstly blocked by the blockage part A102G, the piston A105 is turned to be in rigid connection with the spiral shaft A102, the valve is opened therewith, and the opening moment is always unchanged. The spiral shaft A102 further moves downwards, when the spiral groove A102D communicates with the limiting oil hole A118, the sliding sleeve cavity Q communicates with the low-pressure oil path of the engine for pressure relief, so that the valve is uncontrolled by the cam surface and pushes the piston to move upwards under the action of a spring force of the valve. In the process that the valve is closed, if the limiting oil hole A118 is not blocked by the spiral shaft A102 any more, the movement process that the valve is closed is not affected by the cam surface, movement is achieved under the combined action of the spring force of the valve and the oil pressure. If the spiral shaft A102 does return movement upwards with the cam surface to block the limiting oil hole A118 again before the closure of the valve is completed, at the moment, the sliding sleeve cavity Q becomes the sealed cavity again, the movement rule of the valve will be controlled by the cam surface again together with the spiral shaft A102. The above-mentioned cam surface, spiral surface, limiting oil hole and the like are all of mechanical structures and are constant, and therefore, no matter which manner for closing the valve is adopted, the movement rule of the valve is constant, a gradually increasing or reducing relationship is shown with the rotation of the spiral shaft, and a linear relationship is formed between the change of a valve stroke and a rotation angle of the spiral shaft.

Figure 8A:
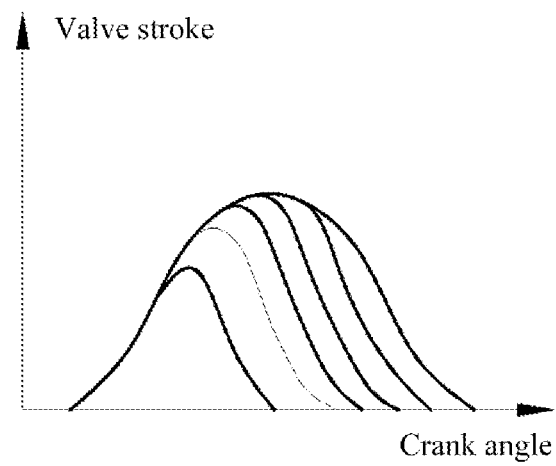
FIG. 8A is a curve chart of a crank angle/valve stroke in the embodiment 1 in FIG. 1A.

The moment when the spiral groove A102D communicates with the limiting oil hole A118 may be changed by rotating the spiral shaft A102, then, the valve closing moment is changed, and thus, functions of a fully variable valve system may be achieved. However, a crank angle corresponding to a valve opening moment remains unchanged all the time, and therefore, the system is particularly suitable for being applied to the control of the variable stroke of an intake valve of an engine having a scavenging process, as shown in FIG. 8A.

When the valve returns, hydraulic oil passes by the one-way valve 108, enters the sliding sleeve cavity Q from the oil inlet hole A107 and enables the spiral shaft A102 to rapidly reset together with the reset spring A104.

Figure 5A:
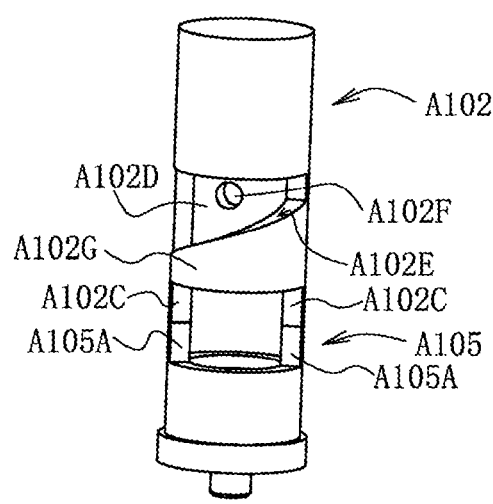
FIG. 5A is a schematic view showing a three-dimensional structure achieved when a rack as shown in FIG. 4A moves rightwards to an extreme position of a limiting device and the corresponding abutting planes of the spiral shaft and the piston abut together.
Figure 6A:
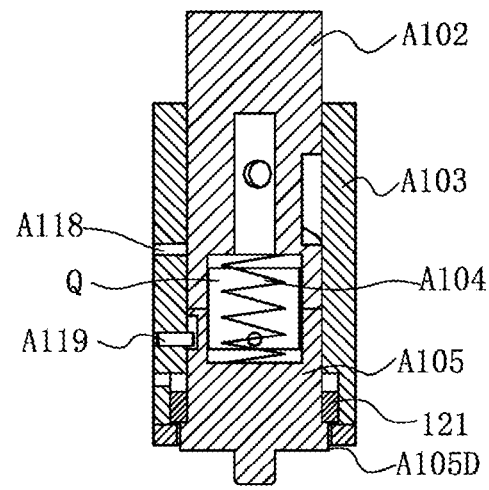
FIG. 6A is a sectional view of parts of members achieved when the rack as shown in FIG. 4A moves rightwards to the extreme position of the limiting device and the system is in an initial state.

In the present embodiment, after the engine stops and the ECU is powered off, the rack 113 moves rightwards to an extreme position limited by a limiting device 116 under the action of a return spring 115, at the moment, a position relationship between the piston A105 and the spiral shaft A102 is in a state as shown in FIG. 5A and FIG. 6A, that is, the piston abutting planes A105B abut against the spiral shaft abutting planes A102B, machine oil in the sliding sleeve cavity Q does not take effects, the camshaft and the valve are in a rigid connection state, the valve stroke is completely controlled by the camshaft 101, and thus, influences on the normal operation of the system due to machine oil loss are avoided.

Figure 7A:
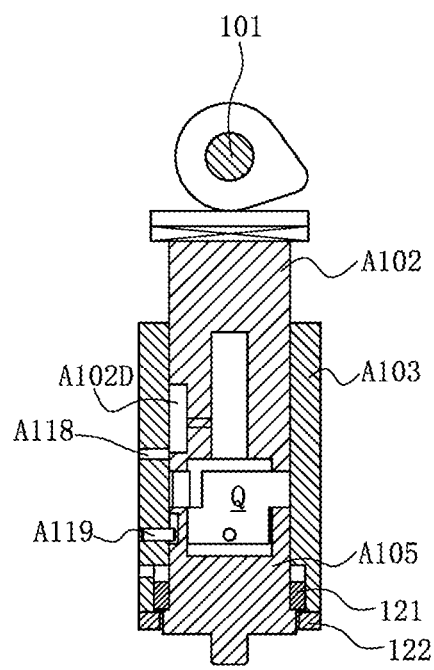
FIG. 7A is a sectional view of parts of members achieved when the rack as shown in FIG. 4A moves leftwards to another extreme position and the system is in a cylinder deactivation state.

In the present embodiment, as shown in FIG. 7A, when the spiral shaft A102 is controlled by a basic circle segment of the cam surface and the rack 113 moves towards a direction opposite to the limiting device 116 to reach another extreme position, the spiral groove A102D communicates with the limiting oil hole A118. At the moment, the camshaft 101 has not started to work, the spiral groove A102D has communicated with the limiting oil hole A118 for pressure relief. Thereafter, no matter whether the spiral shaft A102 is controlled by the basic circle segment or a non-basic-circle segment of the cam surface, the piston A105 will stop moving, the valve is in a closed state, and thus, a cylinder deactivation process of the engine may be achieved.

In the present embodiment, FIG. 4A shows an example in which one rack 113 is meshed with six control gears A102A at the same time, each of the control gears A102A corresponds to one valve assembly, that is, the system is applied to a six-cylinder engine. The concept of the present invention may be expanded to a four-cylinder engine or eight-cylinder engine and the like, and the number of air cylinders is not limited.

In the present embodiment, an end surface of each control gear A102A is provided with a thrust bearing 112, and a wear-resistant gasket 111 is disposed between the thrust bearing 112 and the cam surface of the camshaft 101 to reduce abrasion, and the distance between each piston abutting plane A105B and each spiral shaft abutting plane A102B may be adjusted by means of the thickness of the wear-resistant gasket 111. When a non-cam surface of the camshaft 101 abuts against the spiral shaft A102 (or via the wear-resistant gasket 111 and the thrust bearing 112), the distance therebetween is zero or is approach to zero.

Embodiment 2

Figure 1B:
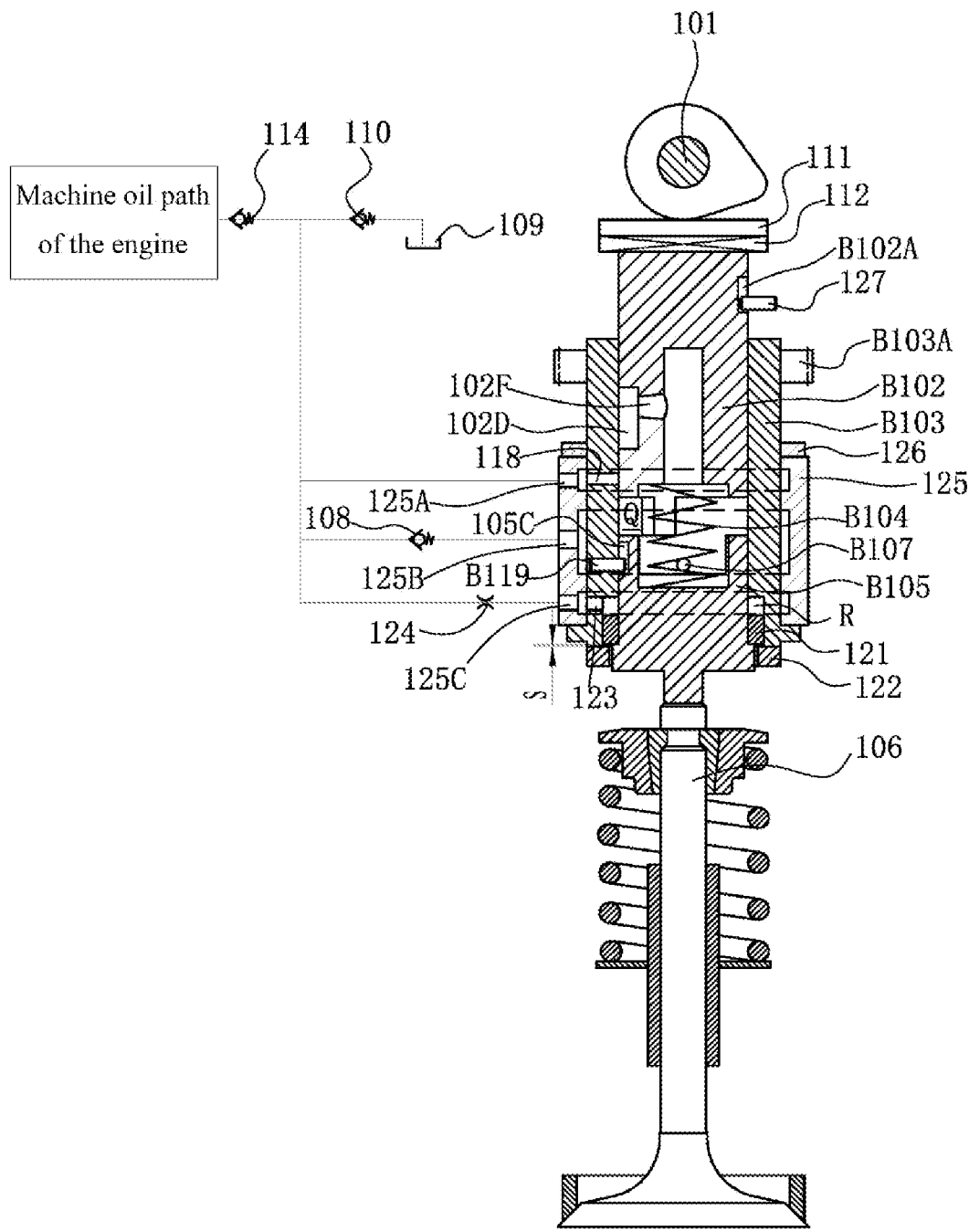
FIG. 1B is a sectional view of embodiment 2 of a fully variable electro-hydraulic valve system provided by the present invention.

As shown in FIG. 1B, a fully variable electro-hydraulic valve system is provided. A limiting sleeve 125 is disposed outside a sliding sleeve B103, the limiting sleeve 125 is fixed relative to an engine, the sliding sleeve B103 and the limiting sleeve 125 are rotatably mounted, and the sliding sleeve B103 is restrained by an axial limiting structure. In the present embodiment, the axial limiting structure is a baffle ring 126 and a flange which are located at two ends of the limiting sleeve 125, the flange and the sliding sleeve B103 are designed to be integrated, and the baffle ring 126 is fixedly connected with the sliding sleeve B103. Of course, for the purpose that the sliding sleeve B103 is only capable of rotating instead of moving relative to the limiting sleeve 125, other axial limiting structures may be further adopted, the descriptions thereof are omitted herein.

A spiral shaft B102 and a piston B105 are slidably connected with the sliding sleeve B103 respectively in a sealing manner, the spiral shaft B102 is axially controlled by a cam surface of a camshaft 101, and the piston B105 abuts against a valve assembly 106. In the sliding sleeve B103, a space between the spiral shaft B102 and the piston B105 is a sliding sleeve cavity Q, a reset spring B104 is clamped and pressed between the spiral shaft B102 and the piston B105, and a combined force of the reset spring B104 and an oil pressure acting on the piston B105 is much smaller than a force of a valve spring acting on the piston B105.

The sliding sleeve B103 is provided with an oil inlet hole B107, a limiting oil hole B118, and a buffering oil hole 123, the limiting sleeve 125 is provided with a first oil hole 125A of the limiting sleeve, a second oil hole 125B of the limiting sleeve and a third oil hole 125C of the limiting sleeve, and a first annular groove, a second annular groove and a third annular groove are formed in the inner wall of the limiting sleeve 125. The first oil hole 125A of the limiting sleeve communicates with the limiting oil hole B118 via the first annular groove, and the first oil hole 125A of the limiting sleeve communicates with a machine oil path of the engine via a pressure relief valve 114 and communicates with an oil pan 109 via a pressure retaining valve 110; the second oil hole 125B of the limiting sleeve communicates with the oil inlet hole B107 via the second annular groove, and the second oil hole 125B of the limiting sleeve is connected with a one-way valve 108, communicates with the machine oil path of the engine via the pressure relief valve 114 and communicates with the oil pan 109 via the pressure retaining valve 110; and the buffering oil hole 123 communicates with a buffering cavity R, the third oil hole 125C of the limiting sleeve communicates with the buffering oil hole 123 via the third annular groove, and the third oil hole 125C is connected with a throttling device 124, communicates with the machine oil path of the engine via the pressure relief valve 114 and communicates with the oil pan 109 via the pressure retaining valve 110. The machine oil path of the engine as well as the pressure relief valve 114, the pressure retaining valve 110 and the oil pan 109 associated with the machine oil path of the engine form a low-pressure oil path of the engine; and the throttling device may be a device such as a throttling valve or a throttling hole.

The sliding sleeve B103 is provided with a first end and a second end which are disposed oppositely, the first end of the sliding sleeve B103 is provided with a step hole structure including a large hole and a small hole, the small hole is matched with a slidable sealing surface of the piston B105, a buffering ring 121 is disposed in the large hole, the buffering ring 121 sleeves the slidable sealing surface of the piston B105 and is slidably matched with the inner circumferential surface of the large hole in a sealing manner, and the buffering ring 121 and the piston B105 form a buffering cavity R in the step hole; and the circumferential surface of the outer end of the piston B105 is provided with a flange B105D for colliding with the buffering ring 121 when a valve of the valve assembly 106 is seated, a piston end of the sliding sleeve B103 is provided with a baffle 122, and when the valve of the valve assembly 106 is closed, a buffer distance S is formed between the buffering ring 121 and the baffle 122.

The above-mentioned structure has a buffering function. When the valve is to be seated, firstly, the piston B105 collides with the buffering ring 121, the machine oil in the buffering cavity R plays a role in damping the movement of the buffering ring 121 due to the effect of the throttling device 124, the buffering ring 121 slowly moves to enable the valve to be slowly seated, which reduces impact damage on the sealing surface of the valve and a valve seat, thereby effectively prolonging the service life of the valve system. When the valve moves downwards again, the buffering ring 121 moves downwards under the action of the pressure of the machine oil, the buffer distance S is very short, and therefore, there is sufficient time for the buffering ring 121 to move to the position of the baffle 122 before the valve is seated again; and the buffering effect of the valve may be adjusted by adjusting the throttling effect and the buffer distance of the throttling device 124.

Figure 2B:
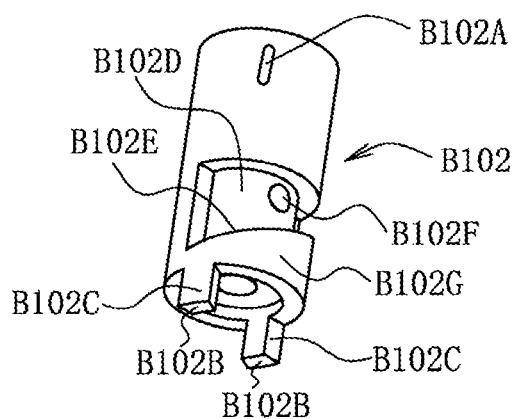
FIG. 2B is a schematic view showing a three-dimensional structure of a spiral shaft in FIG. 1B.
Figure 4B:
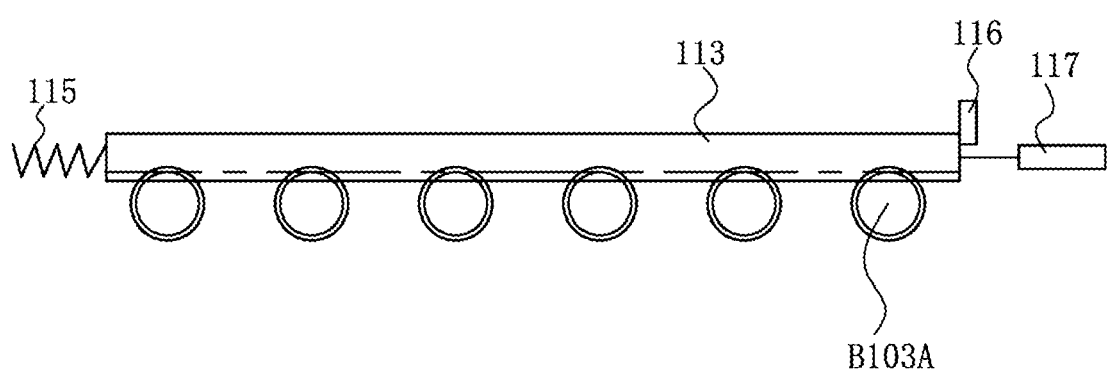
FIG. 4B is a schematic structural view of a gear and rack mechanism for driving a sliding sleeve in the embodiment as shown in FIG. 1B.

As jointly shown in FIG. 1B, FIG. 2B and FIG. 4B, the second end of the sliding sleeve B103 is in transmission connection with a gear and rack mechanism including control gears B103A and a rack 113, the control gears B103A are disposed at the second end of the sliding sleeve B103, and the rack 113 is driven by a linear execution mechanism 117 controlled by an electronic control unit (ECU) of the engine. The control gears B103A and the sliding sleeve B103 may be connected in a torque transfer manner. The linear execution mechanism 117 is based on a mature technology and may be a linear motor or execution electromagnet or air cylinder or hydraulic cylinder and the like, and a connection relationship between the linear execution mechanism 117 and the rack 113 is also familiar to the ordinary skill in the art, the descriptions thereof are omitted herein.

As shown in FIG. 1B and FIG. 2B, the spiral shaft B102 is provided with a second guide groove B102A, the second guide groove B102A extends in the axial direction of the spiral shaft B102, a second positioning pin 127 extends into the second guide groove B102A, and the second positioning pin 127 is fixed relative to the engine. By adopting such a structure, the spiral shaft B102 is only capable of axially moving instead of rotating.

The spiral shaft B102 is provided with a first end and a second end which are disposed oppositely. The spiral shaft B102 is further provided with a spiral structure including a spiral groove B102D formed in a circumferential surface of the spiral shaft B102, the groove surface, close to the first end of the spiral shaft B102, of the spiral groove B102D, is a spiral surface B102E, the part between the spiral surface B102E and the first end of the spiral shaft B102 is a blockage part B102G capable of blocking the limiting oil hole B118, the spiral groove B102D is provided with an oil through hole B102F, the oil through hole B102F communicates with the spiral groove B102D and the sliding sleeve cavity Q, and when the spiral groove B102D communicates with the limiting oil hole B118, the sliding sleeve cavity Q communicates with the low-pressure oil path of the engine for pressure relief.

As shown in FIG. 2B, spiral shaft axial projection portions B102C are disposed at the first end of the spiral shaft B102, and the spiral shaft axial projection portions B102C are provided with spiral shaft abutting planes B102B. In order to ensure that the stress is more balanced during abutment, the first end of the spiral shaft B102 is provided with two spiral shaft axial projection portions B102C, and each of the two spiral shaft axial projection portions B102C is provided with one spiral shaft abutting planes B102B. The two spiral shaft abutting planes B102B are coplanar and are symmetrically disposed relative to the center of the spiral shaft B102.

Figure 3B:
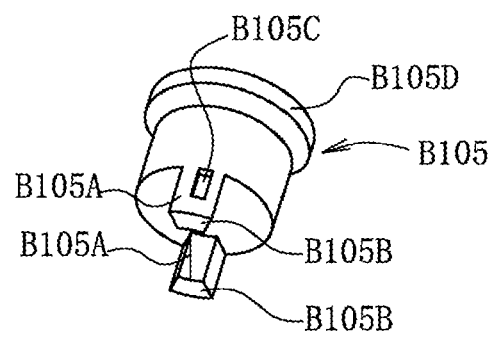
FIG. 3B is a schematic view showing a three-dimensional structure of a piston in FIG. 1B.

As shown in FIG. 1B and FIG. 3B, the sliding sleeve B103 is provided with a first positioning pin B119, the piston B105 is provided with a first guide groove B105C extending axially, and the first positioning pin B119 extends into the first guide groove B105C. The degree of freedom of the piston B105 rotating relative to the sliding sleeve B103 is restrained via the first positioning pin B119, that is, the piston B105 is only capable axially moving instead of rotating along the first guide groove B105C. When the sliding sleeve B103 rotates, the piston B105 may be driven to rotate together.

Piston axial projection portions B105A are disposed at the end, opposite to the spiral shaft B102, of the piston B105, and the head portions of the piston axial projection portions B105A are provided with piston abutting planes B105B. In the similar principle, in order to ensure that the stress is more balanced during abutment, two piston axial projection portions B105A are provided, the head position of each of the two piston axial projection portions B105A is provided with one piston abutting plane B105B, and the piston abutting planes B105B correspond to the spiral shaft abutting planes B102B one to one. The two piston abutting planes B105B are coplanar and are symmetrically disposed relative to the center of the piston B105.

In the present invention, the working principle that the valve is jointly controlled by the spiral shaft and the camshaft to move is that:

the machine oil in the machine oil path (the low-pressure oil path) of the engine may flow into the sliding sleeve cavity Q via the oil inlet hole B107 and the limiting oil hole B118. The spiral shaft B102 moves downwards under the action of the camshaft 101, and when the limiting oil hole B118 is blocked by the blockage part B102G of the spiral shaft B102 (at the moment, the machine oil may not flow out of the oil inlet hole B107 due to the effect of the one-way valve 108), the sliding sleeve cavity Q becomes a sealed cavity, the pressure of the hydraulic oil is increased to push the piston B105 to move downwards, and the piston B105 pushes the valve to move downwards.

The linear execution mechanism 117 controlled by the electronic control unit of the engine drives the rack 113 to move so as to push the sliding sleeve B103 to rotate. When the sliding sleeve B103 rotates, the piston B105 may be driven to rotate together. After the piston abutting planes B105B are separated from the spiral shaft abutting planes B102B, since the spiral shaft B102 is provided with the spiral groove B102D and the blockage part B102G, when the cam surface pushes the spiral shaft B102 to move downwards, the limiting oil hole B118 is firstly blocked by the blockage part B102G, the piston B105 is turned to be in rigid connection with the spiral shaft B102, the valve is opened therewith, and the opening moment is always unchanged. The spiral shaft B102 further moves downwards, when the spiral groove B102D communicates with the limiting oil hole B118, the sliding sleeve cavity Q communicates with the low-pressure oil path of the engine for pressure relief, so that the valve is uncontrolled by the cam surface and pushes the piston to move upwards under the action of a spring force of the valve. In the process that the valve is closed, if the limiting oil hole B118 is not blocked by the spiral shaft B102 any more, the movement process that the valve is closed is not affected by the cam surface, movement is achieved under the combined action of the spring force of the valve and the oil pressure. If the spiral shaft B102 does return movement upwards with the cam surface to block the limiting oil hole B118 again before the closure of the valve is completed, at the moment, the sliding sleeve cavity Q becomes the sealed cavity again, the movement rule of the valve will be controlled by the cam surface again together with the spiral shaft B102. The above-mentioned cam surface, spiral surface, limiting oil hole and the like are all of mechanical structures and are constant, and therefore, no matter which manner for closing the valve is adopted, the movement rule of the valve is constant, a gradually increasing or reducing relationship is shown with the rotation of the spiral shaft, and a linear relationship is formed between the change of a valve stroke and a rotation angle of the spiral shaft.

Figure 8B:
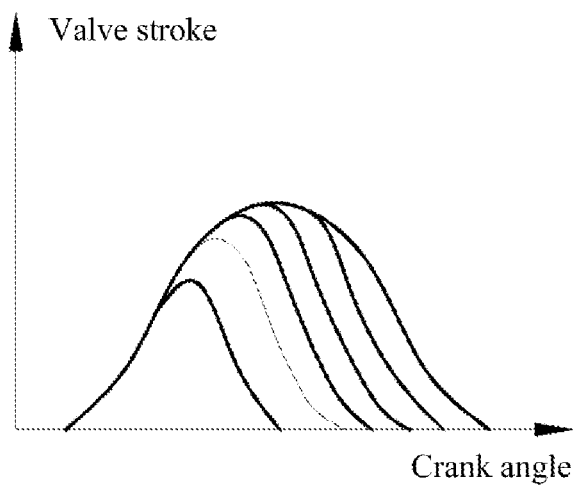
FIG. 8B is a curve chart of a crank angle/valve stroke in the embodiment 2 in FIG. 1B.

The moment when the spiral groove B102D communicates with the limiting oil hole B118 may be changed by rotating the sliding sleeve B103, then, the valve closing moment is changed, and thus, functions of a fully variable valve system may be achieved. However, a crank angle corresponding to a valve opening moment remains unchanged all the time, and therefore, the system is particularly suitable for being applied to the control of the variable stroke of an intake valve of an engine having a scavenging process, as shown in FIG. 8B.

When the valve returns, hydraulic oil passes by the one-way valve 108, enters the sliding sleeve cavity Q from the oil inlet hole B107 and enables the spiral shaft B102 to rapidly reset together with the reset spring B104.

Figure 5B:
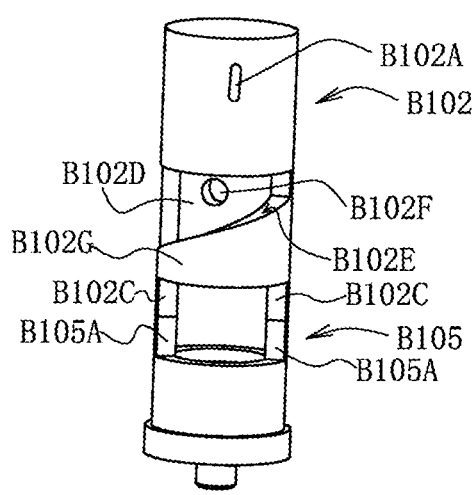
FIG. 5B is a schematic view showing a three-dimensional structure achieved when a rack as shown in FIG. 4B moves rightwards to an extreme position of a limiting device and the corresponding abutting planes of the spiral shaft and the piston abut together.
Figure 6B:
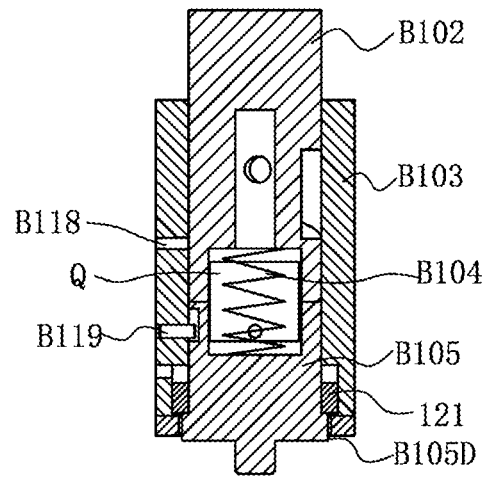
FIG. 6B is a sectional view of parts of members achieved when the rack as shown in FIG. 4B moves rightwards to the extreme position of the limiting device and the system is in an initial state.

In the present embodiment, after the engine stops and the ECU is powered off, the rack 113 moves rightwards to an extreme position of a limiting device 116 under the action of a return spring 115, at the moment, a position relationship between the piston B105 and the spiral shaft B102 is in a state as shown in FIG. 5B and FIG. 6B, that is, the piston abutting planes B105B abut against the spiral shaft abutting planes B102B, machine oil in the sliding sleeve cavity Q does not take effects, the camshaft and the valve are in a rigid connection state, the valve stroke is completely controlled by the camshaft 101, and thus, influences on the normal operation of the system due to machine oil loss are avoided.

Figure 7B:
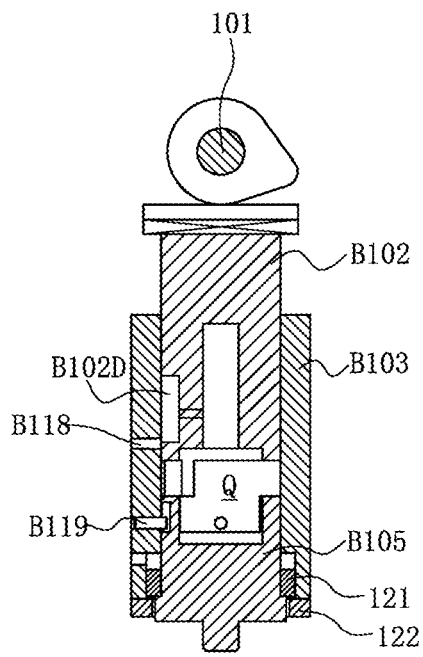
FIG. 7B is a sectional view of parts of members achieved when the rack as shown in FIG. 4B moves leftwards to another extreme position and the system is in a cylinder deactivation state.

In the present embodiment, as shown in FIG. 7B, when the spiral shaft B102 is controlled by a basic circle segment of the cam surface and the rack 113 moves towards a direction opposite to the limiting device 116 to reach another extreme position, the spiral groove B102D communicates with the limiting oil hole B118. At the moment, the camshaft 101 has not started to work, the spiral groove B102D has communicated with the limiting oil hole B118 for pressure relief. Thereafter, no matter whether the spiral shaft B102 is controlled by the basic circle segment or a non-basic-circle segment of the cam surface, the piston B105 will stop moving, the valve is in a closed state, and thus, a cylinder deactivation process of the engine may be achieved.

In the present embodiment, FIG. 4A shows an example in which one rack 113 is meshed with six control gears B103A at the same time, each of the control gears B103A corresponds to one valve assembly, that is, the system is applied to a six-cylinder engine. The concept of the present invention may be expanded to a four-cylinder engine or eight-cylinder engine and the like, and the number of air cylinders is not limited.

In the present embodiment, an end surface of each control gear B103A is provided with a thrust bearing 112, and a wear-resistant gasket 111 is disposed between the thrust bearing 112 and the cam surface of the camshaft 101 to reduce abrasion, and the distance between each piston abutting plane B105B and each spiral shaft abutting plane B102B may be adjusted by means of the thickness of the wear-resistant gasket 111. When a non-cam surface of the camshaft 101 abuts against the spiral shaft B102 (or via the wear-resistant gasket 111 and the thrust bearing 112), the distance therebetween is zero or is approach to zero.

Embodiment 3

Figure 1C:
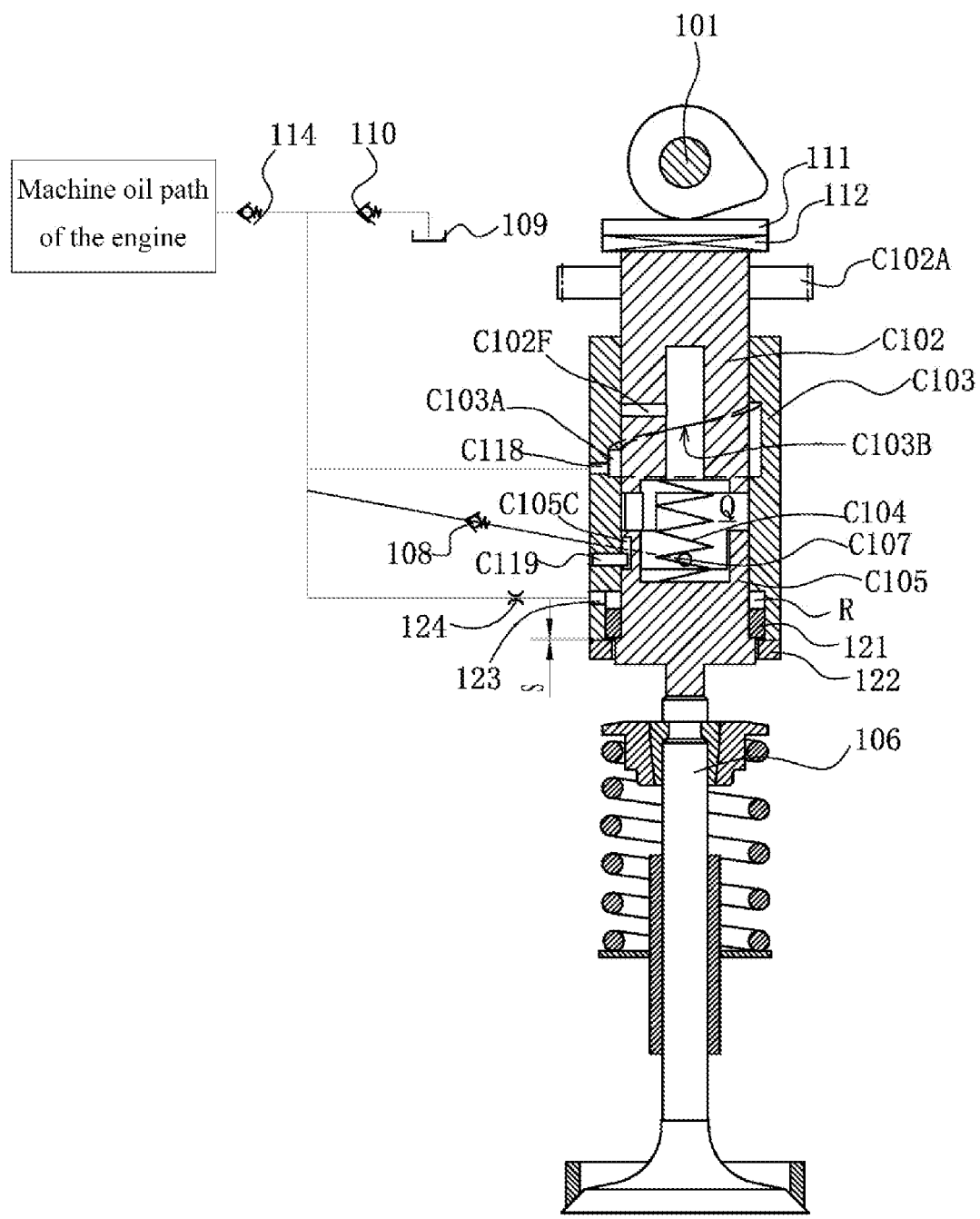
FIG. 1C is a sectional view of embodiment 3 of a fully variable electro-hydraulic valve system provided by the present invention.

As shown in FIG. 1C, a fully variable electro-hydraulic valve system is provided. A sliding sleeve C103 is fixed relative to an engine, a sliding shaft C102 and a piston C105 are slidably connected with the sliding sleeve C103 respectively in a sealing manner, the sliding shaft C102 is axially controlled by a cam surface of a camshaft 101, and the piston C105 abuts against a valve assembly 106.

In the sliding sleeve C103, a space between the sliding shaft C102 and the piston C105 is a sliding sleeve cavity Q, a reset spring C104 is clamped and pressed between the sliding shaft C102 and the piston C105, and a combined force of the reset spring C104 and an oil pressure acting on the piston C105 is much smaller than a force of a valve spring acting on the piston C105. The sliding sleeve C103 is provided with an oil inlet hole C107 and an oil through hole C118; the oil inlet hole C107 is connected with a one-way valve 108, communicates with a machine oil path of the engine via a pressure relief valve 114 and communicates with an oil pan 109 via a pressure retaining valve 110; and the oil through hole C118 communicates with the machine oil path of the engine via the pressure relief valve 114 and communicates with the oil pan 109 via the pressure retaining valve 110.

A piston end of the sliding sleeve C103 is provided with a step hole structure including a large hole and a small hole, the small hole is matched with a slidable sealing surface of the piston C105, a buffering ring 121 is disposed in the large hole, the buffering ring 121 sleeves the slidable sealing surface of the piston C105 and is slidably matched with the inner circumferential surface of the large hole in a sealing manner, and the buffering ring 121 and the piston C105 form a buffering cavity R in the step hole; and the circumferential surface of the outer end of the piston C105 is provided with a flange C105D for colliding with the buffering ring 121 when a valve of the valve assembly 106 is seated, the piston end of the sliding sleeve C103 is provided with a baffle 122, and when the valve of the valve assembly 106 is closed, a buffer distance S is formed between the buffering ring 121 and the baffle 122.

The sliding sleeve C103 is further provided with a buffering oil hole 123 communicating with the buffering cavity R, and the buffering oil hole 123 is connected with a throttling device 124, communicates with the machine oil path of the engine via the pressure relief valve 114 and communicates with the oil pan 109 via the pressure retaining valve 110; and the machine oil path of the engine as well as the pressure relief valve 114, the pressure retaining valve 110 and the oil pan 109 associated with the machine oil path of the engine form a low-pressure oil path of the engine; and the throttling device may be a device such as a throttling valve or a throttling hole.

The above-mentioned structure has a buffering function. When the valve is to be seated, firstly, the piston C105 collides with the buffering ring 121, the machine oil in the buffering cavity R plays a role in damping the movement of the buffering ring 121 due to the effect of the throttling device 124, the buffering ring 121 slowly moves to enable the valve to be slowly seated, which reduces impact damage on the sealing surface of the valve and a valve seat, thereby effectively prolonging the service life of the valve system. When the valve moves downwards again, the buffering ring 121 moves downwards under the action of the pressure of the machine oil, the buffer distance S is very short, and therefore, there is sufficient time for the buffering ring 121 to move to the position of the baffle 122 before the valve is seated again; and the buffering effect of the valve may be adjusted by adjusting the throttling effect and the buffer distance of the throttling device 124.

Figure 2C:
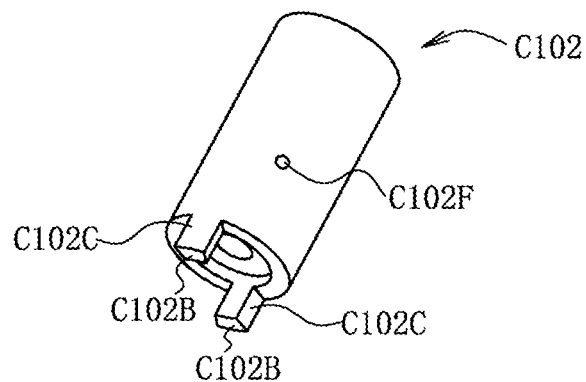
FIG. 2C is a schematic view showing a three-dimensional structure of a sliding shaft in FIG. 1C.
Figure 4C:
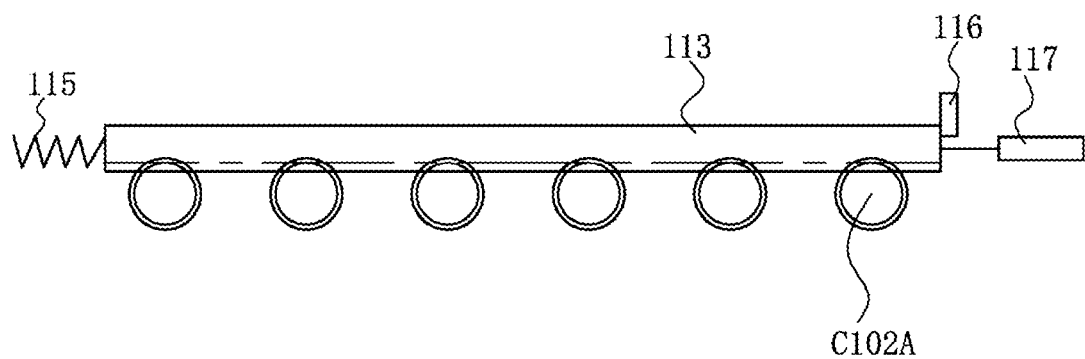
FIG. 4C is a schematic structural view of a gear and rack mechanism for driving the sliding shaft in the embodiment as shown in FIG. 1C.

As jointly shown in FIG. 1C, FIG. 2C and FIG. 4C, the sliding shaft C102 is provided with a first end and a second end which are disposed oppositely, the second end is in transmission connection with a gear and rack mechanism including control gears C102A and a rack 113, the control gears C102A are disposed at the second end of the sliding shaft C102, and the rack 113 is driven by a linear execution mechanism 117 controlled by an electronic control unit (ECU) of the engine. The control gears C102A and the sliding shaft C102 are connected in two manners, with one being fixed connection, and the other one being that the control gears C102A are capable of relatively sliding instead of rotating relative to the sliding shaft C102 in an axial direction, such as key connection; and no matter which connection manner is adopted, a torque has to be transferred. The linear execution mechanism 117 is based on a mature technology and may be a linear motor or execution electromagnet or air cylinder or hydraulic cylinder and the like, and a connection relationship between the linear execution mechanism 117 and the rack 113 is also familiar to the ordinary skill in the art, the descriptions thereof are omitted herein.

As shown in FIG. 2C, the sliding shaft C102 is provided with a limiting oil hole C102F communicating with the sliding sleeve cavity Q, sliding shaft axial projection portions C102C are disposed at the first end of the sliding shaft C102, and the sliding shaft axial projection portions C102C are provided with sliding shaft abutting planes C102B. In order to ensure that the stress is more balanced during abutment, the first end of the sliding shaft C102 is provided with two sliding shaft axial projection portions C102C, and each of the two sliding shaft axial projection portions C102C is provided with one sliding shaft abutting plane C102B. The two sliding shaft abutting planes C102B are coplanar and are symmetrically disposed relative to the center of the sliding shaft C102.

Figure 3C:
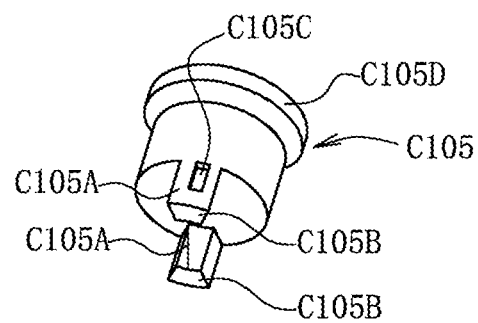
FIG. 3C is a schematic view showing a three-dimensional structure of a piston in FIG. 1C.

As shown in FIG. 1C and FIG. 3C, the sliding sleeve C103 is provided with a positioning pin C119, the piston C105 is provided with a guide groove C105C extending axially, and the positioning pin C119 extends into the guide groove C105C. The degree of freedom of the piston C105 rotating relative to the sliding sleeve C103 is restrained via the positioning pin C119, that is, the piston C105 is only capable of axially moving instead of rotating along the guide groove C105C.

Figure 8C:
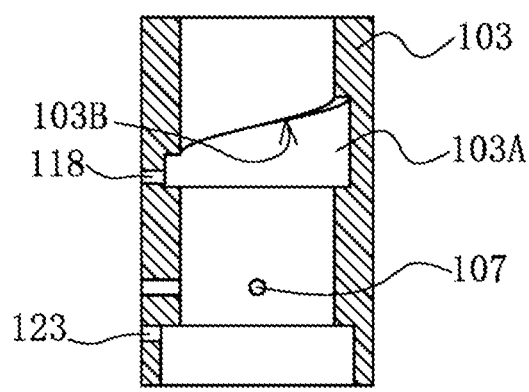
FIG. 8C is a structural sectional view of a sliding sleeve in the embodiment 3 as shown in FIG. 1C.

As shown in FIG. 1C and FIG. 8C, a spiral groove C103A is formed in the inner hole wall of the sliding sleeve C103, the groove surface, close to the second end of the sliding shaft C102, of the spiral groove C103A, is a spiral surface C103B, the spiral groove C103A communicates with the oil through hole C118, and when the spiral groove C103A communicates with the limiting oil hole C102F, the sliding sleeve cavity Q communicates with the low-pressure oil path of the engine for pressure relief.

As shown in FIG. 3C, piston axial projection portions C105A are disposed at the end, opposite to the sliding shaft C102, of the piston C105, and the head portions of the piston axial projection portions C105A are provided with piston abutting planes C105B. In the similar principle, in order to ensure that the stress is more balanced during abutment, two piston axial projection portions C105A are provided, the head position of each of the two piston axial projection portions C105A is provided with one piston abutting plane C105B, and the piston abutting planes C105B correspond to the spiral shaft abutting planes C102B one to one. The two piston abutting planes C105B are coplanar and are symmetrically disposed relative to the center of the piston C105.

In the present invention, the working principle that the valve is jointly controlled by the sliding shaft and the camshaft to move is that:

the machine oil in the machine oil path (the low-pressure oil path) of the engine may flow into the sliding sleeve cavity Q via the oil inlet hole C107 and the oil through hole C118. The sliding shaft C102 moves downwards under the action of the camshaft 101, and when the limiting oil hole C102F is blocked by a non-groove part of the sliding sleeve C103 (at the moment, the machine oil may not flow out of the oil inlet hole C107 due to the effect of the one-way valve 108), the sliding sleeve cavity Q becomes a sealed cavity, the pressure of the hydraulic oil is increased to push the piston C105 to move downwards, and the piston C105 pushes the valve to move downwards.

The linear execution mechanism 117 controlled by the electronic control unit of the engine drives the rack 113 to move so as to push the sliding shaft C102 to rotate. After the sliding shaft abutting planes C102B are separated from the piston abutting planes C105B, since the sliding shaft C102 is provided with the limiting oil hole C102F communicating with the sliding sleeve cavity Q, and the sliding sleeve C103 is provided with the spiral groove C103A, when the cam surface pushes the sliding shaft C102 to move downwards, the limiting oil hole C102F is firstly blocked by the non-groove part of the sliding sleeve C103, the piston C105 is turned to be in rigid connection with the sliding shaft C102, the valve is opened therewith, and the opening moment is always unchanged. The sliding shaft C102 further moves downwards, when the spiral groove C103A communicates with the limiting oil hole C102F, the sliding sleeve cavity Q communicates with the low-pressure oil path of the engine for pressure relief, so that the valve is uncontrolled by the cam surface and pushes the piston to move upwards under the action of a spring force of the valve. In the process that the valve is closed, if the limiting oil hole C102F is not blocked by the sliding shaft C102 any more, the movement process that the valve is closed is not affected by the cam surface, movement is achieved under the combined action of the spring force of the valve and the oil pressure. If the sliding shaft C102 does return movement upwards with the cam surface to block the limiting oil hole C102F again before the closure of the valve is completed, at the moment, the sliding sleeve cavity Q becomes the sealed cavity again, the movement rule of the valve will be controlled by the cam surface again together with the sliding shaft C102. The above-mentioned cam surface, spiral surface, oil through hole and the like are all of mechanical structures and are constant, and therefore, no matter which manner for closing the valve is adopted, the movement rule of the valve is constant, a gradually increasing or reducing relationship is shown with the rotation of the sliding shaft, and a linear relationship is formed between the change of a valve stroke and a rotation angle of the sliding shaft.

Figure 9C:
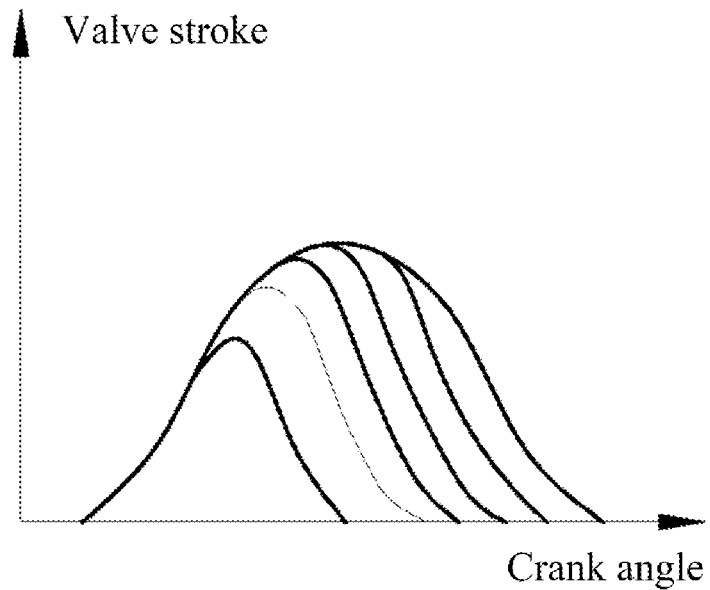
FIG. 9C is a curve chart of a crank angle/valve stroke in the embodiment in FIG. 1C.
Figure 10C:
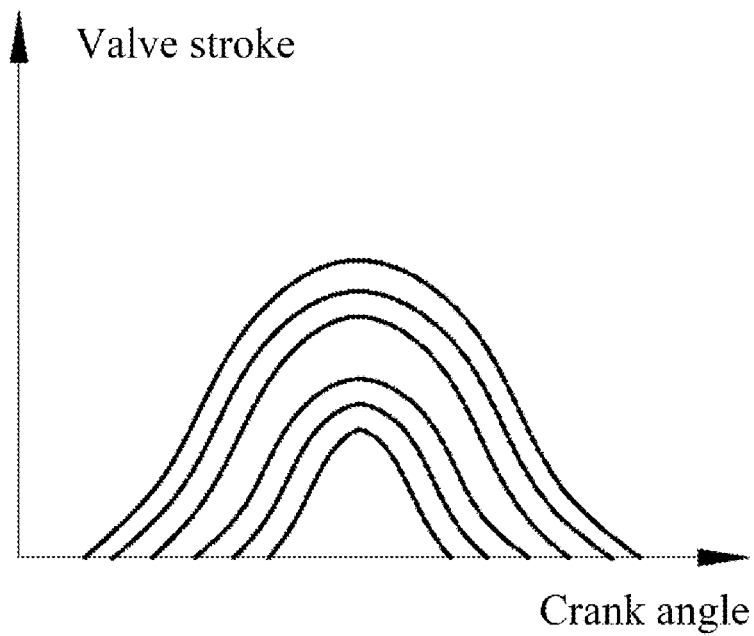
FIG. 10 is a curve chart of a crank angle/valve stroke in the disclosed art mentioned in the background art.

The moment when the spiral groove C103A communicates with the limiting oil hole C102F may be changed by rotating the sliding shaft C102, then, the valve closing moment is changed, and thus, functions of a fully variable valve system may be achieved. However, a crank angle corresponding to a valve opening moment remains unchanged all the time, and therefore, the system is particularly suitable for being applied to the control of the variable stroke of an intake valve of an engine having a scavenging process, as shown in FIG. 9C.

When the valve returns, hydraulic oil passes by the one-way valve 108, enters the sliding sleeve cavity Q from the oil inlet hole C107 and enables the sliding shaft C102 to rapidly reset together with the reset spring C104.

Figure 5C:
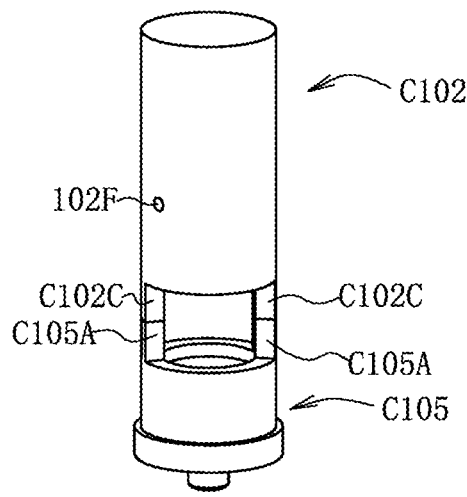
FIG. 5C is a schematic view showing a three-dimensional structure achieved when a rack as shown in FIG. 4C moves rightwards to an extreme position of a limiting device and the corresponding abutting planes of the spiral shaft and the piston abut together.
Figure 6:
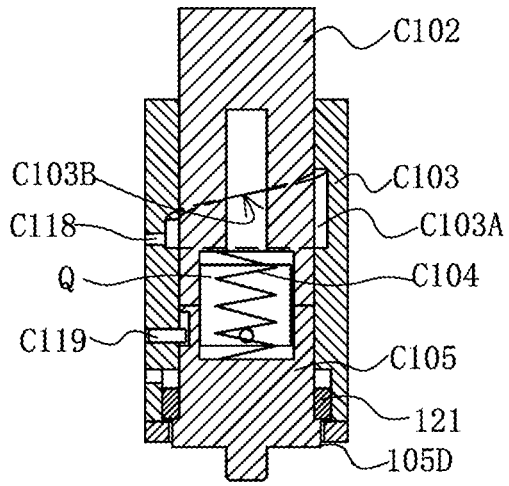
FIG. 6C is a sectional view of parts of members achieved when the rack as shown in FIG. 4C moves rightwards to the extreme position of the limiting device and the system is in an initial state.

In the present embodiment, after the engine stops and the ECU is powered off, the rack 113 moves rightwards to an extreme position of a limiting device 116 under the action of a return spring 115, at the moment, a position relationship between the piston C105 and the sliding shaft C102 is in a state as shown in FIG. 5C and FIG. 6C, that is, the piston abutting planes C105B abut against the sliding shaft abutting planes C102B, machine oil in the sliding sleeve cavity Q does not take effects, the camshaft and the valve are in a rigid connection state, the valve stroke is completely controlled by the camshaft 101, and thus, influences on the normal operation of the system due to machine oil loss are avoided.

Figure 7C:
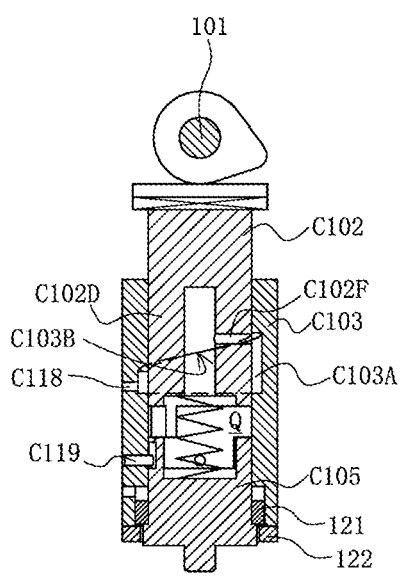
FIG. 7C is a sectional view of parts of members achieved when the rack as shown in FIG. 4C moves leftwards to another extreme position and the system is in a cylinder deactivation state.

In the present embodiment, as shown in FIG. 7C, when the sliding shaft C102 is controlled by a basic circle segment of the cam surface and the rack 113 moves towards a direction opposite to the limiting device 116 to reach another extreme position, the spiral groove C103A communicates with the limiting oil hole C102F. At the moment, the camshaft 101 has not started to work, the spiral groove C103A has communicated with the limiting oil hole C102F for pressure relief. Thereafter, no matter whether the sliding shaft C102 is controlled by the basic circle segment or a non-basic-circle segment of the cam surface, the piston C105 will stop moving, the valve is in a closed state, and thus, a cylinder deactivation process of the engine may be achieved.

In the present embodiment, FIG. 4C shows an example in which one rack 113 is meshed with six control gears C102A at the same time, each of the control gears C102A corresponds to one valve assembly, that is, the system is applied to a six-cylinder engine. The concept of the present invention may be expanded to a four-cylinder engine or eight-cylinder engine and the like, and the number of air cylinders is not limited.

In the present embodiment, an end surface of each control gear C102A is provided with a thrust bearing 112, and a wear-resistant gasket 111 is disposed between the thrust bearing 112 and the cam surface of the camshaft 101 to reduce abrasion, and the distance between each piston abutting plane C105B and each sliding shaft abutting plane C102B may be adjusted by means of the thickness of the wear-resistant gasket 111. When a non-cam surface of the camshaft 101 abuts against the sliding shaft C102 (or via the wear-resistant gasket 111 and the thrust bearing 112), the distance therebetween is zero or is approach to zero.

The present invention is not limited to the above-mentioned embodiments, and various improvements based on the concept, principle, structure and method provided by the present invention will fall within the protection scope of the present invention.

INDUSTRIAL APPLICABILITY

Since the spiral shaft is provided with the spiral groove and the blockage part, before the cam surface pushes the spiral shaft to move downwards, the limiting oil hole has been blocked by the blockage part, the piston is in rigid connection with the spiral shaft, the valve is opened therewith when the spiral shaft moves downwards, and the opening moment is always unchanged. The spiral shaft further moves downwards, when the spiral groove communicates with the limiting oil hole, the sliding sleeve cavity communicates with the low-pressure oil path of the engine for pressure relief, so that the valve is uncontrolled by the cam surface and is seated and closed under the action of a spring force of the valve. The moment when the spiral groove communicates with the limiting oil hole may be changed by rotating the spiral shaft, then, the valve closing moment is changed, and thus, functions of a fully variable valve system may be achieved. However, a crank angle corresponding to a valve opening moment remains unchanged, and therefore, the system is particularly suitable for being applied to the control of the variable stroke of an intake valve of an engine having a scavenging process. When the valve returns, hydraulic oil enters the sliding sleeve cavity from the oil inlet hole and enables the spiral shaft to rapidly reset together with the reset spring, the linear execution mechanism controlled by the electronic control unit of the engine drives the spiral shaft to rotate, and therefore, the system is high in response speed, convenient to control, capable of replacing an expensive high-speed electromagnetic valve and suitable for being applied to a multi-cylinder engine.

As the same concept, the moment when the spiral groove communicates with the limiting oil hole may be further changed by rotating the sliding sleeve, and then, the valve closing moment is changed.

As the same concept, it is also possible that the spiral groove is formed in the inner hole wall of the sliding sleeve, and the sliding shaft is provided with the limiting oil hole communicating with the sliding sleeve cavity. Before the cam surface pushes the sliding shaft to move downwards, the limiting oil hole has been blocked by the non-groove part of the sliding sleeve, the piston is in rigid connection with the sliding shaft, the valve is opened therewith when the spiral shaft moves downwards, and the opening moment is always unchanged. The sliding shaft further moves downwards, when the spiral groove communicates with the limiting oil hole, the sliding sleeve cavity communicates with the low-pressure oil path of the engine for pressure relief, so that the valve is uncontrolled by the cam surface and is seated and closed under the action of a spring force of the valve. The moment when the spiral groove communicates with the limiting oil hole may be changed by rotating the sliding shaft, then, the valve closing moment is changed, and thus, functions of a fully variable valve system may be achieved. However, a crank angle corresponding to a valve opening moment remains unchanged all the time, and therefore, the system is particularly suitable for being applied to the control of the variable stroke of an intake valve of an engine having a scavenging process.

What is claimed is:

1. A fully variable electro-hydraulic valve system, comprising:
   a camshaft and a valve assembly;
   a sliding sleeve, a spiral shaft, a piston, and a reset spring, wherein the sliding sleeve is fixed relative to an engine, the spiral shaft and the piston are slidably connected with the sliding sleeve respectively in a sealing manner, an inner cavity between the spiral shaft and the piston is known as a sliding sleeve cavity, the reset spring is clamped and pressed between the spiral shaft and the piston, the piston abuts against the valve assembly, and the spiral shaft is axially controlled by a cam surface of the camshaft;
   wherein the spiral shaft is provided with a first end and a second end which are disposed oppositely, the spiral shaft is provided with a spiral structure, the second end of the spiral shaft is in transmission connection with a gear and rack mechanism comprising control gears and a rack, the control gears are disposed at the second end of the spiral shaft, and the rack is driven by a linear execution mechanism controlled by an electronic control unit of the engine;
   wherein the sliding sleeve is provided with an oil inlet hole and a limiting oil hole, the oil inlet hole and the limiting oil hole respectively communicate with a low-pressure oil path of the engine, and a one-way valve is disposed on a connecting pipeline between the oil inlet hole and the low-pressure oil path of the engine;
   wherein the spiral structure comprises a spiral groove formed in a circumferential surface of the spiral shaft, a groove surface, close to the first end of the spiral shaft, of the spiral groove, is a spiral surface, a part between the spiral surface and the first end of the spiral shaft is a blockage part capable of blocking the limiting oil hole, the spiral groove is provided with an oil through hole, the oil through hole communicates with the spiral groove and the sliding sleeve cavity, and when the spiral groove communicates with the limiting oil hole, the sliding sleeve cavity communicates with the low-pressure oil path of the engine for pressure relief;
   wherein spiral shaft axial projection portions are disposed at the first end of the spiral shaft, the spiral shaft axial projection portions are provided with spiral shaft abutting planes, piston axial projection portions are disposed at the end, opposite to the spiral shaft, of the piston, and head portions of the piston axial projection portions are provided with piston abutting planes;

wherein the sliding sleeve is provided with a positioning pin, the piston is provided with a guide groove extending axially, and the positioning pin extends into the guide groove; and wherein the gear and rack mechanism is further provided with a limiting device and a return spring, and when the return spring enables the rack to move to an extreme position limited by the limiting device, the piston abutting planes abut against the spiral shaft abutting planes, the limiting oil hole is blocked by the blockage part of the spiral shaft, and the valve stroke of the valve assembly is controlled by the camshaft.

2. The fully variable electro-hydraulic valve system of claim 1, wherein when the spiral shaft is controlled by a basic circle segment of the cam surface and the rack moves towards a direction opposite to the limiting device to reach another extreme position, the spiral groove communicates with the limiting oil hole.

3. The fully variable electro-hydraulic valve system of claim 1, wherein the first end of the spiral shaft is provided with two of the spiral shaft axial projection portions, and a head position of each of the two spiral shaft axial projection portions is provided with one spiral shaft abutting plane; and wherein two of the piston axial projection portions are provided, a head position of each of the two piston axial projection portions is provided with one piston abutting plane, and the piston abutting planes correspond to the spiral shaft abutting planes one to one.

4. The fully variable electro-hydraulic valve system of claim 3, wherein the two piston abutting planes are coplanar, and the two spiral shaft abutting planes are coplanar.

5. The fully variable electro-hydraulic valve system of claim 4, wherein the two piston abutting planes are symmetrically disposed relative to a center of the piston, and the two spiral shaft abutting planes are symmetrically disposed relative to a center of the spiral shaft.

6. The fully variable electro-hydraulic valve system of claim 1, wherein the control gears are connected with the spiral shaft in a torque transfer manner.

7. The fully variable electro-hydraulic valve system of claim 1, wherein the rack is meshed with a plurality of control gears of the spiral shaft at the same time.

8. The fully variable electro-hydraulic valve system of claim 1, wherein a piston end of the sliding sleeve is provided with a step hole structure comprising a large hole and a small hole, the small hole is matched with a slidable sealing surface of the piston, a buffering ring is disposed in the large hole, the buffering ring sleeves the slidable sealing surface of the piston and is slidably matched with an inner circumferential surface of the large hole in a sealing manner, and the buffering ring and the piston form a buffering cavity in the step hole structure; wherein a circumferential surface of the outer end of the piston is provided with a flange for colliding with the buffering ring when a valve of the valve assembly is seated, the piston end of the sliding sleeve is provided with a baffle, and when the valve of the valve assembly is closed, a buffer distance is formed between the buffering ring and the baffle; and wherein the sliding sleeve is provided with a buffering oil hole communicating with the buffering cavity, and the buffering oil hole communicates with the low-pressure oil path of the engine via a throttling device.

9. A fully variable electro-hydraulic valve system, comprising:

a camshaft and a valve assembly;

a sliding sleeve, a spiral shaft, a piston, and a reset spring, wherein the sliding sleeve is provided with a first end and a second end which are disposed oppositely, the sliding sleeve is provided with an oil inlet hole and a limiting oil hole, the spiral shaft is provided with a first end and a second end which are disposed oppositely, the spiral shaft is provided with a spiral structure, the spiral shaft and the piston are slidably connected with the sliding sleeve respectively in a sealing manner, an inner cavity between the spiral shaft and the piston is known as a sliding sleeve cavity, the reset spring is clamped and pressed between the spiral shaft and the piston, the piston abuts against the valve assembly, and the spiral shaft is axially controlled by a cam surface of the camshaft; and wherein a gear and rack mechanism, wherein the gear and rack mechanism comprises control gears and a rack, and the rack is driven by a linear execution mechanism controlled by an electronic control unit of an engine; wherein wherein a limiting sleeve is disposed outside the sliding sleeve, the limiting sleeve is fixed relative to the engine, the sliding sleeve and the limiting sleeve are rotatably mounted, and the sliding sleeve is restrained by an axial limiting structure; the limiting sleeve is provided with a first oil hole of the limiting sleeve and a second oil hole of the limiting sleeve, a first annular groove and a second annular groove are formed in the inner wall of the limiting sleeve, the first oil hole of the limiting sleeve communicates with the limiting oil hole via the first annular groove, the second oil hole of the limiting sleeve communicates with the oil inlet hole via the second annular groove, the first oil hole of the limiting sleeve and the second oil hole of the limiting sleeve respectively communicate with a low-pressure oil path of the engine, and a one-way valve is disposed on a connecting pipeline between the second oil hole of the limiting sleeve and the low-pressure oil path of the engine;

wherein the spiral structure comprises a spiral groove formed in a circumferential surface of the spiral shaft, a groove surface, close to the first end of the spiral shaft, of the spiral groove, is a spiral surface, a part between the spiral surface and the first end of the spiral shaft is a blockage part capable of blocking the limiting oil hole, the spiral groove is provided with an oil through hole, the oil through hole communicates with the spiral groove and the sliding sleeve cavity, and when the spiral groove communicates with the limiting oil hole, the sliding sleeve cavity communicates with the low-pressure oil path of the engine for pressure relief;

wherein spiral shaft axial projection portions are disposed at the first end of the spiral shaft, the spiral shaft axial projection portions are provided with spiral shaft abutting planes, piston axial projection portions are disposed at the end, opposite to the spiral shaft, of the piston, and head portions of the piston axial projection portions are provided with piston abutting planes;

wherein the sliding sleeve is provided with a first positioning pin, the piston is provided with a first guide groove extending axially, and the first positioning pin extends into the first guide groove; the spiral shaft is provided with a second guide groove, the second guide groove extends in the axial direction of the spiral shaft, a second positioning pin extends into the second guide groove, and the second positioning pin is fixed relative to the engine; and wherein the control gears are disposed at the second end of the sliding sleeve, the gear and rack mechanism is further provided with a limiting device and a return spring, and when the return spring enables the rack to move to an extreme position limited by the limiting device, the piston abutting planes abut against the spiral shaft abutting planes, the limiting oil hole is blocked by the blockage part of the spiral shaft, and the valve stroke of the valve assembly is controlled by the camshaft.

10. The fully variable electro-hydraulic valve system of claim 9, wherein when the spiral shaft is controlled by a basic circle segment of the cam surface and the rack moves towards a direction opposite to the limiting device to reach another extreme position, the spiral groove communicates with the limiting oil hole.

11. The fully variable electro-hydraulic valve system of claim 9, wherein the first end of the spiral shaft is provided with two of the spiral shaft axial projection portions, and a head position of each of the two spiral shaft axial projection portions is provided with one spiral shaft abutting plane; and wherein two of the piston axial projection portions are provided, a head position of each of the two piston axial projection portions is provided with one piston abutting plane, and the piston abutting planes correspond to the spiral shaft abutting planes one to one.

12. The fully variable electro-hydraulic valve system of claim 11, wherein the two piston abutting planes are coplanar, and the two spiral shaft abutting planes are coplanar.

13. The fully variable electro-hydraulic valve system of claim 12, wherein the two piston abutting planes are symmetrically disposed relative to a center of the piston, and the two spiral shaft abutting planes are symmetrically disposed relative to a center of the spiral shaft.

14. The fully variable electro-hydraulic valve system of claim 9, wherein the control gears are connected with the sliding sleeve in a torque transfer manner.

15. The fully variable electro-hydraulic valve system of claim 9, wherein the rack is meshed with the plurality of control gears of the spiral shaft at the same time.

16. A fully variable electro-hydraulic valve system, comprising:
a camshaft and a valve assembly;
a sliding sleeve, a sliding shaft, a piston, and a reset spring, wherein the sliding sleeve is fixed relative to an engine, the sliding shaft and the piston are slidably connected with the sliding sleeve respectively in a sealing manner, an inner cavity between the sliding shaft and the piston is known as a sliding sleeve cavity, the reset spring is clamped and pressed between the sliding shaft and the piston, the piston abuts against the valve assembly, and the sliding shaft is axially controlled by a cam surface of the camshaft;
wherein the sliding shaft is provided with a first end and a second end which are disposed oppositely, the second end of the sliding shaft is in transmission connection with a gear and rack mechanism comprising control gears and a rack, the control gears are disposed at the second end of the sliding shaft, and the rack is driven by a linear execution mechanism controlled by an electronic control unit of the engine;
wherein the sliding sleeve is provided with an oil inlet hole and an oil through hole, the oil inlet hole and the oil through hole respectively communicate with a low-pressure oil path of the engine, and a one-way valve is disposed on a connecting pipeline between the oil inlet hole and the low-pressure oil path of the engine; wherein wherein the sliding shaft is provided with a limiting oil hole communicating with the sliding sleeve cavity, a spiral groove is formed in the inner hole wall of the sliding sleeve, a groove surface, close to the second end of the sliding shaft, of the spiral groove, is a spiral surface, the spiral groove communicates with the oil through hole, and when the spiral groove communicates with the limiting oil hole, the sliding sleeve cavity communicates with the low-pressure oil path of the engine for pressure relief;

wherein sliding shaft axial projection portions are disposed at the first end of the sliding shaft, the sliding shaft axial projection portions are provided with sliding shaft abutting planes, piston axial projection portions are disposed at the end, opposite to the sliding shaft, of the piston, and head portions of the piston axial projection portions are provided with piston abutting planes;

wherein the sliding sleeve is provided with a positioning pin, the piston is provided with a guide groove extending axially, and the positioning pin extends into the guide groove; and the gear and rack mechanism is further provided with a limiting device and a return spring, and when the return spring enables the rack to move to an extreme position limited by the limiting device, the piston abutting planes abut against the sliding shaft abutting planes, the limiting oil hole is blocked by a non-groove part of the sliding sleeve, and the valve stroke of the valve assembly is controlled by the camshaft.

17. The fully variable electro-hydraulic valve system of claim 16, wherein when the sliding shaft is controlled by a basic circle segment of the cam surface and the rack moves towards a direction opposite to the limiting device to reach another extreme position, the spiral groove communicates with the limiting oil hole.

18. The fully variable electro-hydraulic valve system of claim 16, wherein the first end of the sliding shaft is provided with two of the sliding shaft axial projection portions, and a head position of each of the two sliding shaft axial projection portions is provided with one sliding shaft abutting plane; and wherein two of the piston axial projection portions are provided, a head position of each of the two piston axial projection portions is provided with one piston abutting plane, and the piston abutting planes correspond to the sliding shaft abutting planes one to one.

19. The fully variable electro-hydraulic valve system of claim 18, wherein the two piston abutting planes are coplanar, and the two sliding shaft abutting planes are coplanar.

20. The fully variable electro-hydraulic valve system of claim 19, wherein the two piston abutting planes are symmetrically disposed relative to a center of the piston, and the two sliding shaft abutting planes are symmetrically disposed relative to a center of the sliding shaft.

21. The fully variable electro-hydraulic valve system of claim 16, wherein the control gears are connected with the sliding shaft in a torque transfer manner.

22. The fully variable electro-hydraulic valve system of claim 16, wherein the rack is meshed with the control gears of the sliding shaft at the same time.

* * * * *